(12) United States Patent
Fernández Gutiérrez

(10) Patent No.: US 8,595,510 B2
(45) Date of Patent: Nov. 26, 2013

(54) METHODS, APPARATUS AND SYSTEMS TO IMPROVE SECURITY IN COMPUTER SYSTEMS

(75) Inventor: Álvaro Fernández Gutiérrez, Barcelona (ES)

(73) Assignee: Media Patents, S.L. (ES)

( * ) Notice: Subject to any disclaimer, the term of this patent is extended or adjusted under 35 U.S.C. 154(b) by 0 days.

(21) Appl. No.: 13/194,701

(22) Filed: Jul. 29, 2011

(65) Prior Publication Data

US 2012/0331307 A1    Dec. 27, 2012

(30) Foreign Application Priority Data

Jun. 22, 2011 (ES) .................................. 201131053

(51) Int. Cl.
*G06F 21/00* (2013.01)

(52) U.S. Cl.
USPC ............................. 713/190; 726/30; 713/176

(58) Field of Classification Search
USPC ..................... 713/190, 176; 726/30
See application file for complete search history.

(56) References Cited

U.S. PATENT DOCUMENTS

| | | | |
|---|---|---|---|
| 5,592,616 A * | 1/1997 | Finch et al. ........................ | 714/42 |
| 5,953,422 A | 9/1999 | Angelo et al. | |
| 6,367,011 B1 | 4/2002 | Lee et al. | |
| 7,203,841 B2 | 4/2007 | Jackson et al. | |
| 7,891,008 B2 | 2/2011 | Fortune et al. | |
| 8,201,173 B2 * | 6/2012 | Day et al. ........................ | 718/102 |
| 2004/0111610 A1 | 6/2004 | Slick et al. | |
| 2004/0111749 A1 | 6/2004 | Zhang et al. | |
| 2004/0117653 A1 | 6/2004 | Shapira et al. | |
| 2006/0015748 A1 * | 1/2006 | Goto et al. ........................ | 713/190 |
| 2006/0048221 A1 | 3/2006 | Morais et al. | |
| 2006/0080553 A1 | 4/2006 | Hall | |
| 2007/0067130 A1 | 3/2007 | Toda et al. | |
| 2007/0113103 A1 | 5/2007 | Ye et al. | |
| 2007/0198851 A1 * | 8/2007 | Goto ........................ | 713/187 |
| 2008/0005586 A1 * | 1/2008 | Munguia ........................ | 713/189 |
| 2008/0010473 A1 | 1/2008 | Harris | |
| 2008/0163008 A1 | 7/2008 | Jacob | |
| 2008/0229117 A1 | 9/2008 | Shin et al. | |
| 2008/0256363 A1 | 10/2008 | Balacheff et al. | |
| 2009/0031135 A1 * | 1/2009 | Kothandaraman ............ | 713/176 |
| 2009/0049309 A1 | 2/2009 | Brinker et al. | |
| 2009/0254761 A1 | 10/2009 | De La Crouee et al. | |
| 2009/0259924 A1 | 10/2009 | Amann et al. | |

(Continued)

OTHER PUBLICATIONS

Platte et al., "A New Encryption and Hashing Scheme for the Security Architecture for Microprocessors", Robotics Research Institute: Section Information Technology, Lecture Notes in Computer Science, 2006, vol. 4237/2006, 120-129, Springer, University of Dortmund, Germany.

(Continued)

*Primary Examiner* — Michael Pyzocha
(74) *Attorney, Agent, or Firm* — Cantor Colburn LLP

(57) ABSTRACT

In one implementation a computer system stores a software program that contains some instructions organized in blocks wherein each block contains a first part with instructions and a second part with an electronic signature or hash value, wherein the computer system includes a security component within the processor that allows the execution of instructions of the first part of a block of data only if the hash value of the data is correct.

15 Claims, 29 Drawing Sheets

(56) References Cited

U.S. PATENT DOCUMENTS

| | | | |
|---|---|---|---|
| 2009/0276617 | A1 | 11/2009 | Grell et al. |
| 2010/0029370 | A1 | 2/2010 | Robinson et al. |
| 2010/0293388 | A1 | 11/2010 | Ammer et al. |
| 2011/0087872 | A1 | 4/2011 | Shah et al. |
| 2011/0246817 | A1 | 10/2011 | Orsini et al. |
| 2011/0307961 | A1* | 12/2011 | de Perthuis .................... 726/26 |

OTHER PUBLICATIONS

Platte et al., "A Cache Design for a Security Architecture for Microprocessors (SAM)", Robotics Research Institute: Section Information Technology, Lecture Notes in Computer Science, 2006, vol. 3894/2006, 435-449, Springer, University of Dortmund, Germany.

Platte et al., "A Combined Hardware and Software Architecture for Secure Computing", Computer Engineering Institute, University of Dortmund, Proceedings of the 2nd Conference on Computing Frontiers, May 2005, ACM, Germany.

Platte et al., "A New Encryption and Hashing Scheme for the Security Architecture for Microprocessors", Robotics Research Institute: Section Information Technology, Lecture Notes in Computer Science, 2006 (The year of publication is sufficiently earlier than the effective U.S. Filing date, and any foreign priority date, so that the particular month of publication is not an issue), vol. 4237/2006, 120-129, Springer, University of Dortmund, Germany.

Platte et al., "A Cache Design for a Security Architecture for Microprocessors (SAM)", Robotics Research Institute: Section Information Technology, Lecture Notes in Computer Science, 2006 (The year of publication is sufficiently earlier than the effective U.S. Filing date, and any foreign priority date, so that the particular month of publication is not an issue), vol. 3894/2006, 435-449, Springer, University of Dortmund, Germany.

* cited by examiner

METHODS, APPARATUS AND SYSTEMS TO IMPROVE SECURITY IN COMPUTER SYSTEMS

CROSS-REFERENCE TO RELATED APPLICATIONS

The present application claims priority to and the benefit of Spanish Patent Application No. 201131053, filed Jun. 22, 2011.

TECHNICAL FIELD

The field relates to security of computer systems.

BACKGROUND

Today computers systems are highly vulnerable to virus, worms, Trojans and other malware and security vulnerabilities.

Recently there has appeared a new malware used by a new bootnet called TDL-4 that has switched from using centralized networks to control the bootnet using Peer to Peer networks, making it impossible to stop the bootnet by stopping their control servers, because the control of the new bootnet is distributed over the P2P network. Thus far more than 4.5 million computers may be infected by this new bootnet.

In July 2011 a new vulnerability was discovered in the Skype program that allows a hacker to hijack user accounts. Another vulnerability was discovered in the iOS operating system from Apple that could allow hackers to remotely control iPhones, iPads and iPod touch when the devices open an infected pdf file.

There is thus a need to improve the security in computer systems.

SUMMARY OF THE DISCLOSURE

Methods, apparatus and systems are provided that improve security in computer systems.

In one implementation a computer system stores a software program that contains some instructions organized in blocks wherein each block contains a first part with instructions and a second part with an electronic signature or hash value, wherein the computer system includes a security component within the processor that allows the execution of instructions of the first part of a block of data only if the hash value of said data is correct.

In one implementation, data blocks have the same size as the level 1 instruction cache.

In one implementation, the security component stores cryptographic keys in an internal memory of the computer system.

In one implementation, said cryptographic keys are used to verify that the hash values of the data blocks are correct

BRIEF DESCRIPTION OF THE DRAWINGS

Other advantages and features of the present invention can be seen in the following description in which, with a non-limiting character, preferred embodiments are referred to in relation to the attached drawings:

FIG. 6B shows a structure of a software program that includes hash values.

DETAILED DESCRIPTION

Figure 1:
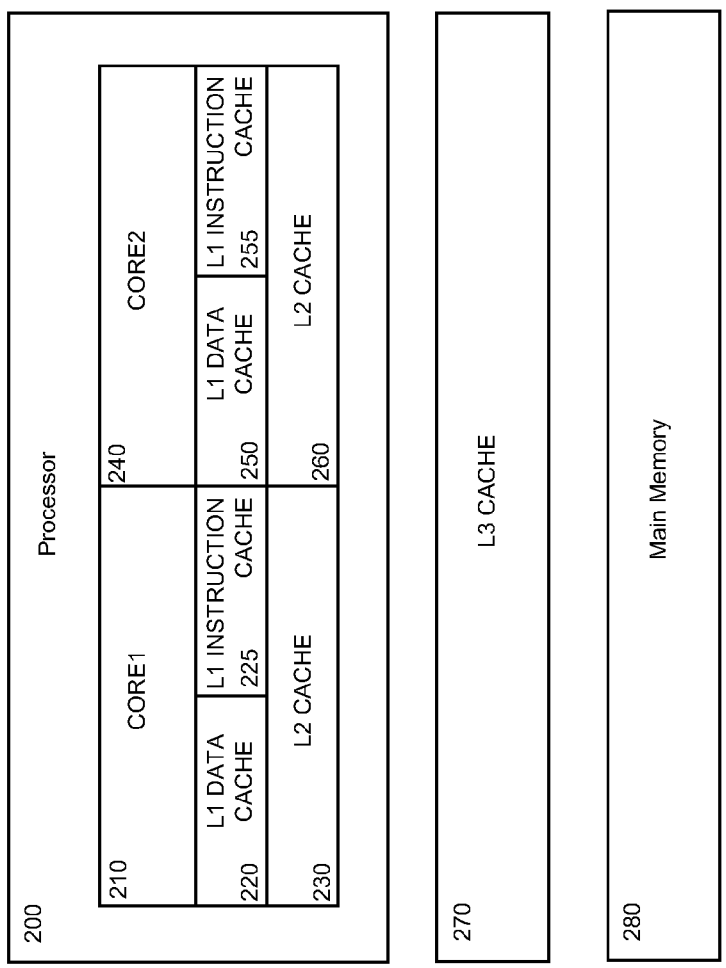
FIG. 1 shows an example of a processor and two external memories that may be used in some implementations.

In the following description, references to "one implementation" or "an implementation", "in some implementations", or like terms mean that the feature or features being referred to is included in at least one implementation of the present invention. Further, separate references to "one implementation" or "an implementation", "in some implementations", or like terms in the foregoing description do not necessarily refer to the same implementation; however, such implementations are also not mutually exclusive unless so stated, and except as will be readily apparent to those skilled in the art from the description. For example, a feature, structure, act, etc. described in one implementation may also be included in other implementations. Thus, the present invention includes a variety of combinations and/or integrations of the implementations described herein.

In this detailed description of implementations, some specific details already known in the prior art are not explained for better understanding of the different implementations. For example, some components, elements, methods and processes well known in the prior art are not explained for clarity of explanation.

A description of how the memory may operate in different computerized systems may be found in the book Modern Operating Systems, Andrew S. Tanenbaum, 2008, published by Prentice Hall. Chapter 3 of the book is entitled "Memory Management" and describes the operation of various types of memories and different devices and concepts related to the functioning of memory in computerized systems, for example, no memory abstraction, memory abstraction, address spaces, base and limit registers, swapping, virtual memory, pages, paging, virtual addresses, virtual address space, MMU (Memory Management Unit), page frames, page fault, page table, TLB (Translation Lookaside Buffers) and other concepts that are well known in the prior art and not explained here to simplify the explanation, but different implementations can use some of these concepts and elements.

"Word" is often used to refer to a set of data used by a processor. A word is a fixed set of bits that can be managed as a unit by the instruction set of the processor or processor hardware. In systems of 32 bits each word consists of 32 bits or 4 bytes and in 64-bit systems each word consists of 64 bits or 8 bytes. For example, there are 32-bit processors that can load 4 bytes of data in a processor register with a single instruction and there are 64-bit processors that can load 8 bytes of data in a processor register with a single instruction. Other implementations are also possible.

Different implementations can improve the security of different types of computer systems or computer devices, like for example as a desktop computer, a laptop computer, a server, a mobile phone, a smartphone, a media player such as iPod, a television, a smart-TV, a PC tablet, a set top box, a router, a firewall, a switch, a proxy, an SOC (System on a Chip) and/or any other electronic equipment or computing having a hardware component to execute instructions or processes in software or in hardware, such as an electronic device that comprises a processor or an FPGA (Field Programmable Gate Array).

FIGS. 1 to 4 show, without limiting the scope of the invention, various examples of processors and memories that can be used in different implementations of the various inventions described.

FIG. 1 shows a processor 200 consisting of two cores, CORE1 210 and CORE2 240, each of which has a cache memory.

In the following description the abbreviation L1 refers to the first level cache memory that usually is the cache memory with the lowest latency. The abbreviation L2 refers to the second level cache memory.

CORE1 210 has a L1 data cache 220, a L1 instruction cache 225 and a L2 cache 230. CORE2 240 has a L1 data cache 250, a L1 instruction cache 255 and a L2 cache 260.

FIG. 1 also shows an L3 external cache 270 which can be used by CORE1 and CORE2 processor 200 and a main memory 280.

Figure 2:
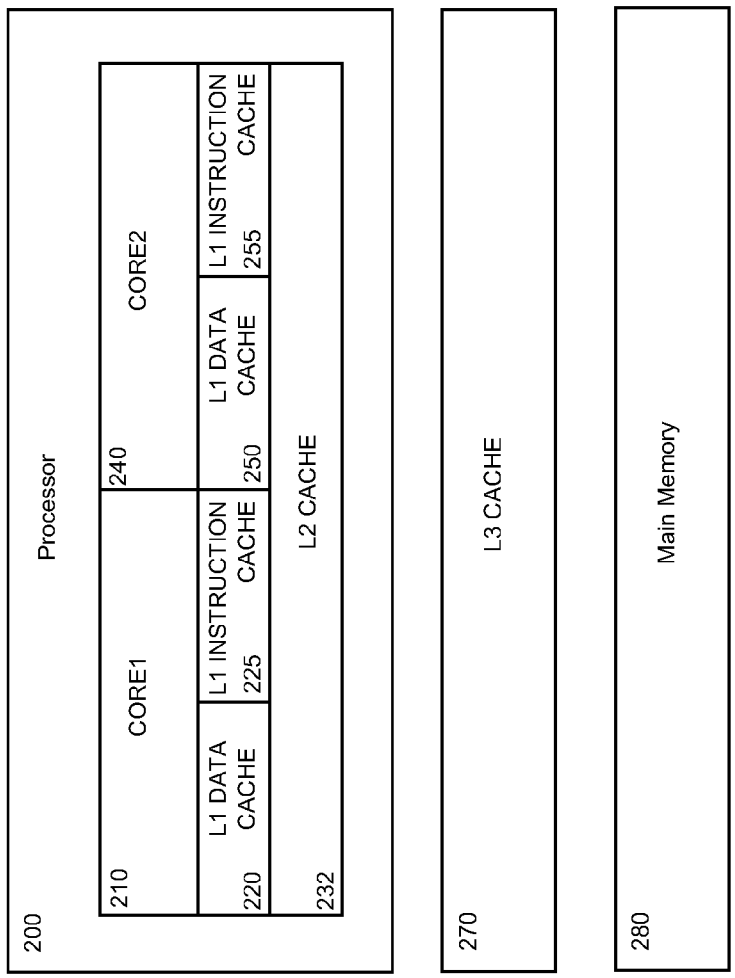
FIG. 2 shows another example of a processor and two external memories that may be used in some implementations.

FIG. 2 shows an example in which the L2 cache memory 232 is a memory shared by both cores CORE1 210 and CORE2 240.

Figure 3:
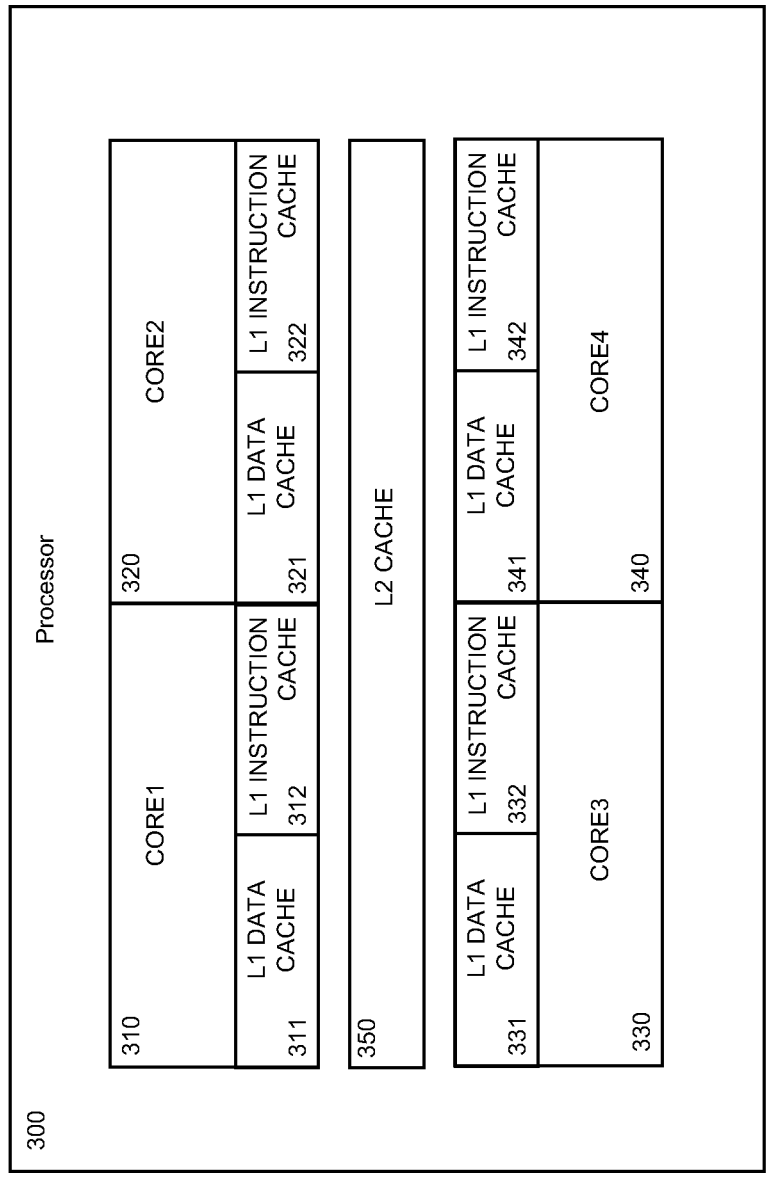
FIG. 3 shows an example of a processor with four cores and a shared L2 cache memory that may be used in some implementations.

FIG. 3 shows one example of a processor 300 with four cores CORE1 310, CORE2 320, CORE3 330 and CORE4 340. Each of the cores CORE1, CORE2, CORE3 and CORE4 has a L1 data cache 311, 321, 331 and 341, respectively, and a L1 instruction cache 312, 322, 332 and 342, respectively. FIG. 3 also shows a L2 cache 350 that may be used by all four cores.

Figure 4:
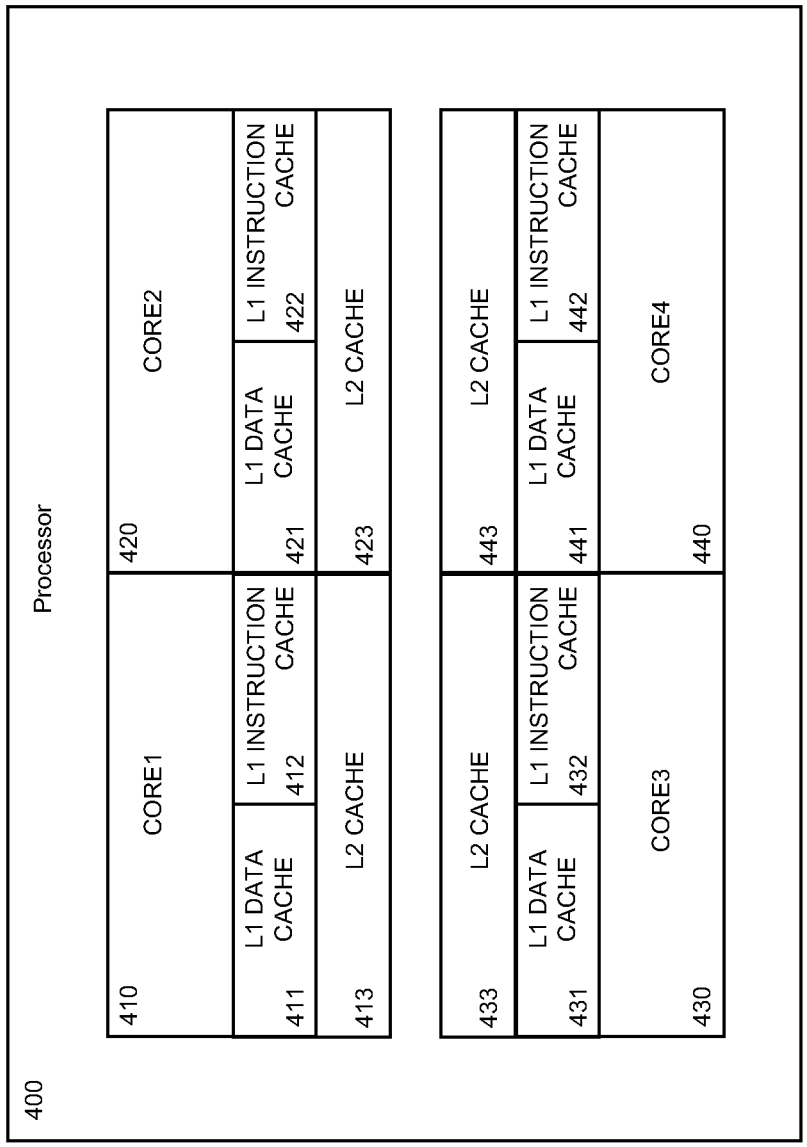
FIG. 4 shows another example of a processor with four cores and four L2 cache memories that may be used in some implementations.

FIG. 4 shows another example of a processor 400 with four cores. CORE1 410 has a L1 data cache 411 and a L1 instruction cache 412. CORE2 420 has a L1 data cache 421 and a L1 instruction cache 422. CORE3 430 has a L1 data cache 431 and a L1 instruction cache 432. CORE4 440 has a L1 data cache 441 and a L1 instruction cache 442. Each one of the cores CORE1 410, CORE2 420, CORE3 430 and CORE4 440 has its own L2 cache 413, 423, 433 and 443 respectively.

FIGS. 1 to 4 show non-limiting examples of processors that may be used in some implementations. However, other different processors with a different number of cores, for example 16 to 100 cores, and with different cache memory configurations may be used in different implementations of the various inventions described.

Figure 5:
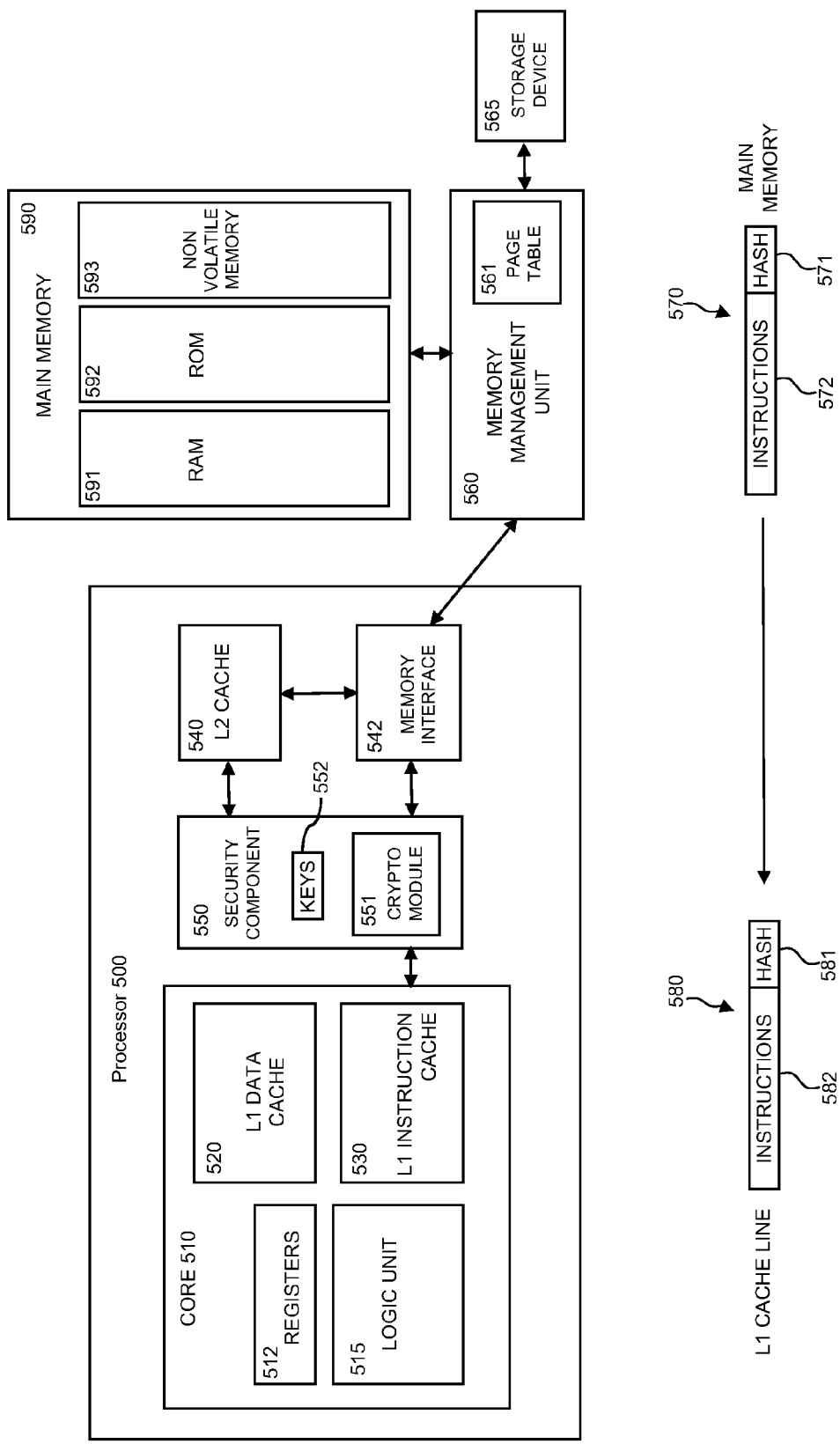
FIG. 5 shows an example of a processor that may be used in some implementations.

FIG. 5 shows an example of an implementation with a processor 500 that has a single CORE 510 to simplify the explanation.

In one implementation, CORE 510 of the processor 500 may comprise a logic unit 515, registers 512, a L1 data cache 520 and a L1 instruction cache 530.

The processor 500 also has an L2 cache memory 540, a memory interface component 542, which may include features such as communication management with the main memory 590, and a security component 550. The processor 500 may have other cache memories not shown in the figure, like for example a L3 memory cache.

Main memory 590 may include a combination of memories, such as RAM (Random Access Memory) 591, ROM (Read Only Memory) 592 or a non-volatile memory 593, like, for example, flash memory. Different implementations may use other types of main memory.

The security component 550 has a memory KEYS 552 capable to store cryptographic information, like for example cryptographic keys.

In some implementations, the memory KEYS 552 may be a ROM memory or FLASH memory located inside the security component 550.

In some implementations, the security component 550 may access an external memory that stores cryptographic keys, for example a memory inside the processor 500 but outside the security component or a memory in a component outside the processor 500 but in the same computing device as the processor 500.

The security component 550 may also include a crypto module 551 that is capable of executing different cryptographic algorithms to calculate and/or verify hash values such as algorithms used in the following standards: MD5, SHA1, SHA2, SHA256, SHA512 and others.

Below is a brief explanation about hash functions and cryptographic algorithms.

A hash function is a function, procedure or algorithm that converts a first set of data into a second smaller set of data generally called "hash values", "hash codes", "hashes" and other names, so that an accidental or intentional modification of any byte in the first set of data causes an alteration in the hash value. Hash functions are also known as one-way hash function or compression function.

A n-bit cryptographic hash function is a function taking an arbitrary long message and a cryptographic key as input and outputting a fixed-length hash value of size n bits.

Cryptographic hash functions have many information security applications, for example, digital signatures and message authentication codes (MAC). Message Authentication Codes (MAC) is a hash function with addition of a secret key. The hash value is a function of both the first set of data and the key.

Different implementations may use different type of hash functions and/or cryptographic algorithms, with or without secret keys or cryptographic keys.

The ideal cryptographic hash function has the following characteristics:
- it is easy to compute the hash value for a given message
- it is computationally infeasible to find out the message that generated a given hash value
- it is computationally infeasible to change a message with a given hash value
- it is computationally infeasible to find two messages with the same hash value Cryptographic hash values may be called digital fingerprints, digital signatures, checksums or hash values.

A digital signature may be used for proving the authenticity of a digital message or data. A valid digital signature gives a recipient reason to believe that the message or data was created by a known sender, and that it was not altered in transit.

Digital signatures may employ a type of asymmetric cryptography. For messages sent through a non-secure channel, a properly implemented digital signature gives the receiver reason to believe the message was sent by the claimed sender. Digital signatures are equivalent, in some respects, to traditional handwritten signatures with properly implemented digital signatures are more difficult to forge than the handwritten type.

Digital signatures can also provide non-repudiation, meaning that the signer cannot successfully claim they did not sign a message, while also claiming their private key remains secret. Further, some non-repudiation methods offer a time stamp for the digital signature, so that even if the private key is exposed, the signature is valid nonetheless. Digitally signed messages may be anything performable as bit string. Examples include electronic mail, contacts, or a message sent via come other cryptographic protocol.

A digital signature may consists of three algorithms:
- A first algorithm is the key generation algorithm that selects a private key uniformly at random for a set of possible private keys. The algorithm outputs the private key and a corresponding public key.
- A second algorithm is the signing algorithm that, given a message and a private key, produces a signature.
- A third algorithm is the signature verifying algorithm that, given a message, public key and a signature, either accepts or rejects the message's claim to authenticity.

In some implementations, a digital signature or hash value generated from a first data and a first private key may be verified by using the corresponding public key. It should be computationally infeasible to generate a valid signature for a party who does not possess the private key.

The hash value obtained by a hash function or cryptographic hash function is usually called "message digest", "digest", "digital signature", "message digest", "fingerprint", "cryptographic checksum" and others names.

In the following explanation the terms "hash value", "hash" or "HASH" (in the figures) refer to the output of cryptographic algorithms and/or hash functions that uses cryptographic keys, like for example digital signatures.

Returning to FIG. 5, when data from an address of the main memory are transferred to the cache memory, for example to the L1 data cache 520 or the L1 instruction cache 530, a single word is not transferred (such as a Word of 32 or 64 bits) rather a set of contiguous words are transferred, called "cache line". In FIG. 5, the element 580 represents a cache line, for example a cache line of the L1 instruction cache and element 570 represent data stored in the main memory.

In one implementation, when a memory address that is not stored in the cache memory is required by the processor, the entire cache line is transmitted from the main memory to L1 cache memory, either the L1 data cache 520 or L1 instruction cache 530.

The memory address of each cache line is calculated based on the size of the cache line. For example in a 64-byte cache line the last 6 bits of the memory address of the cache line are zero. In a 128-byte cache line, the last 7 bits of the memory address of each cache line are zero. In general, in a cache line of a size of $2^n$ bits, the last n bits (the lower n bits) of the address of the cache line are zero.

In one implementation, when a processor instruction reads a memory address that is not stored in the cache memory, the cache line containing the data is first transferred from main memory (or from another intermediate cache, such as L2 or L3) to a L1 cache memory, either the L1 data cache or the L1 instruction cache.

In some implementations, it may sometimes be necessary to make space in the L1 cache memory to store the cache line. To do this, one or more cache lines may be evicted from the L1 cache memory to other cache memory such as L2. In turn, the L2 cache memory may evict its data to other L3 cache memory (not shown in the figure) and data may also be evicted to the main memory 590.

In FIG. 5, element 570 represents a cache line stored in a given memory address of the main memory 590, which contains a first part 572, which for example may store executable instructions, and a second part HASH 571 storing a hash value that may be computed using a cryptographic hash function based on the data 572 and a cryptographic key.

In one implementation, when the processor 500 requests one or more data stored in the main memory, the data 570 are transferred from main memory to the L1 cache of core 510, for example using MMU 560 and memory interface 542.

The element 580 of FIG. 5 represents the same data 570 stored in a cache line of the L1 cache memory of the processor. The cache line 580 is formed by a first data portion 582, which for example may store executable instructions, for example machine code instructions executable by the CORE 510, and a second part 581 storing a hash value.

In the following explanation we use the term "data block" to refer to elements like 570 and 580 that comprise a first data, for example instructions, an a second data that is a hash value or digital signature calculated using as input the first data and, optionally, a cryptographic key.

In some implementations, the data 572 may comprise instructions that may be executed by the processor 500, for example by the core 510 of the processor 500 and the cache line 570 data can be stored in a cache line in the L1 instruction cache 530.

In some implementations the data 572 may store any kind of data and may be stored in a cache line in the L1 data cache 520.

In some implementations, the data 582 of the cache line 580 may store instructions executable by the processor 500, for example machine code instructions executable by the core 510, and before the core 510 can execute instructions 582 from the cache line 580 stored in the L1 Instruction cache 530, the security component 550 uses the crypto module 551 to verify that the hash value 581 is correct using a cryptographic hash function or a cryptographic algorithm that takes as input the data 582 and a cryptographic key, for example a key stored in the memory KEYS 552.

If the crypto module 551 verifies that the hash value is correct, the security component allows the CORE 510 to execute the instructions 582 stored in the cache line 580. Otherwise the security component doesn't allow the core 510 to execute the instructions stored in the cache line 580.

In one implementation, the security component 550 verifies the hash value 571 while transferring data 570 from the main memory to the cache line 580 of the L1 instruction cache and only stores the data 570 in the cache line 580 if the hash value 571 is correct.

In some implementations, each cache line 580 of the L1 cache memories may have an additional bit, called a SECURE BIT, which indicates that the hash value is correct. In one implementation, the CORE 510 can not execute instructions in the cache line 580 until the security component checks that the hash value 581 is correct and stores this information in the SECURE BIT associated to the cache line 580.

In one implementation when data 570 of the main memory is transferred to the cache line 580, for example of the L1 instruction cache, the security component stores the value 0 in the SECURE BIT associated to the cache line 580 to indicate that the hash value 581 has not yet been checked.

The security component then verifies the hash value using the crypto module 551 and If the hash value 581 is correct, the security component changes the SECURE BIT value to 1 to indicate that the hash value 581 is correct and therefore the CORE 510 may execute any instruction stored in the part 582 of cache line 580. If the hash value 581 is not correct the security component doesn't change the value 0 in the SECURE BIT and the CORE 510 cannot execute the instruction stored in the cache line 580.

In one implementation, the security component may read the L2 cache memory and can verify the hash value and update the SECURITY BIT in the L2 cache if the hash value is correct, for example storing the value 1 in the SECURE BIT.

For example, the SECURE BIT may be set to the value 0 when a data block is transferred from the main memory to the L2 cache memory. If the data is transferred from the L2 cache to the L1 cache, then the security component verifies the hash value and updates the SECURE BIT, for example, the SECURE BIT may be set to the value 1 if the hash value is correct.

In one implementation, if the security component has updated the SECURE BIT to the value 1 in the L2 cache, it is not necessary to verify the hash value again when the data is transferred from the L2 cache to a cache line of the L1 cache.

In one implementation, a L1 instruction cache line of the L1 cache memory having a correct hash value and the SECURE BIT set to the value 1 is transferred to the L2 cache maintaining the SECURE BIT=1 and then, transferred back to the L1 instruction cache maintaining the secure bit=1. This way, it is not necessary to verify the hash value of the cache line each time it is moved between L1 and L2 memories.

In some implementations, the security component is only used with the L1 instruction cache and it is not used with the L1 data cache, and the core or cores may read and write data in the L1 data cache without the processor 500 verifying hash values in the cache lines of the L1 data cache.

In other implementations, the security component is used with the L1 instruction cache and also with some determined memory part of the L1 data cache.

When executable instructions of programs are executed in the core 510, the instructions usually read and write memory addresses in the L1 data cache, so it may not be convenient to use hash values in all the L1 data cache lines. But certain applications and certain parts of the operating system of the computing device may use hash values in certain parts of the L1 data cache memory, as explained later in some examples, like for example a just in time compiler that generates and stores machine code instructions in a L1 data cache that will be transferred to be executed in a L1 instruction cache.

In one implementation, the security component starts verifying the hash value 581 of the data 582 while transferring the data 570 from main memory to the cache line 580. For example, if the cache line has 128 bytes, of which 108 bytes are instructions and 20 bytes are a hash value, and the processor has 64 bits, data 570 are passed to the processor cache memory in blocks of 64 bits or 8 bytes, thus needing 16 transfers to move data to the cache line. In some implementations the security component can start verifying the hash value 581 while running these 16 transfers.

In one implementation, the crypto module starts verifying the hash value without having all the data 570 stored in the cache line 580, for example by starting the verification of the hash value using the first bytes of data that are being transferred to the cache line 580.

In one implementation, the MMU transfers the data 570 from main memory to the cache line 580 transferring the words in the order that the security component needs to verify the hash value, thereby accelerating the verification of the hash value 581 of the cache line 580 and the processor can execute the instructions stored in part 582 of cache line 580 more quickly.

In one implementation, if a hash value data checked by the security component is not correct, then the security component does not transfer the data 570 stored in the main memory to the cache line 580. In one implementation, the processor can generate an interrupt, such as a hardware interrupt or software interrupt, for example to inform the operating system that instructions 572 do not have a correct hash value.

In some implementations the crypto module 551 may use symmetric cryptography algorithms where one cryptographic algorithm uses a secret key to generate a first hash value of a first data and the crypto module has access to the secret key, for example stored in the memory KEYS 552, and the crypto module executes the same algorithm to calculate the hash value of the same data and compares the generated hash value with the first hash value to verify the authenticity of the first hash value.

In some implementations, the crypto module may use public-key cryptography, where a pair of keys called public key and private key are used as follows: a first cryptographic algorithm may be used to generate the public key and private key pair and a second cryptographic algorithm uses the private key to generate a digital signature or hash value of the data to sign and a third cryptographic algorithm may use the public key to verify that the digital signature is correct and has been generated using the private key. For example the second algorithm using the private key may be used to generate the hash value 571 and the crypto module may execute the third algorithm using the public key to verify the hash value 571 (or to verify the same hash value stored in the hash value 581 if the crypto module 551 reads the instructions 582 and the hash value 581 from the cache line 580).

Storing cryptography private keys or symmetric keys inside an integrated circuit may be a risk. For example there are some technologies that allow the reading of data in a hard disk drive after it has been deleted and overwritten many times. The number of times that a data should be overwritten in a hard disk in order to delete it is typically unknown and can depend on how the technology used to read the data in the hard disk drives evolves. The same may happen with data stored inside integrated circuits.

In some implementations the crypto module doesn't store private keys and only stores public keys and it can execute the third algorithm to verify that a hash value is correct but it can not execute the second algorithm to calculate or generate hash values.

In some implementations the crypto module may have access to both the public key and the private key.

In some implementations, instead of using a public key algorithm to generate a digital signature or hash value of the data, a one way hash function is used to generate a one-way hash of the data and then the one-way hash data is encrypted using a private key, thereby generating the digital signature or hash value of the data and the public key may be used to verify the hash value.

Although some implementations use cryptographic keys and cryptographic hash functions or digital signatures, in other implementations the crypto module may use hash functions that don't use cryptographic keys and/or cryptographic hash functions.

In some implementations, the security component 550 and/or the crypto module 551 may use specialized hardware to calculate the value of the hash value. For example, in one implementation the security component 550 and/or the crypto module 551 may comprise a combination of logic gates that implement Boolean functions such as NAND, OR, XOR, NOR, or any other type of logic gates.

In one implementation, the crypto module 551 and other elements of the security component 550 may be programmed or implemented using a hardware definition language or hardware description language such as "Verilog HDL" or VHDL ("VHSIC Hardware Description Language" or "Very High Speed Integrated Circuit Hardware Description Language").

In one implementation, the crypto module may use parallel computations that take as input data part or all of the 864 bits (108 bytes) of data 582, for example using logic gates which act in parallel on a part or all of the 864 bits of data 582. In one implementation, the security component 550 may also use bits of a cryptographic key as input of the calculations in parallel.

In some implementations, the processor 500 that comprises the security component 550 is an ASIC (Application Specific Integrated Circuit).

In one implementation, the cryptographic keys and cryptographic hash functions may be custom implemented for use in a given electronic device, such as an electronic device custom designed for a given entity.

In one implementation the processor 500 comprises a FPGA (Field Programmable Gate Array) that may be configured or programmed to execute different cryptographic algorithms, calculate different hash functions and to store cryptographic keys.

In the example of FIG. 5 the L1 cache memories are shown as part of CORE 510 and the L2 cache is shown as part of the processor 500, but other configurations are also possible. For example, L1 cache memories may be within the microprocessor 500 but outside the CORE 510. In another example both cache memories L1 and L2 may be outside the microprocessor 500. In some implementations there may be a single cache memory L1, for example used to store both data and instructions.

The example in FIG. 5 also shows a component MMU 560 (Memory Management Unit) outside the processor 500 that communicates with the processor 500 and main memory 590.

In one implementation, in a system that uses virtual memory, the MMU stores in the main memory 590 one or more pages of data and program instructions and stores in the storage device 565 the rest of the program data that are not currently needed in the main memory. In this way, by storing in the main memory only the portions of the program required at a given time or time period, the system can execute a set of programs that take up much more space than is available in main memory.

In one implementation, the MMU is the device responsible for transferring the pages stored in the storage device 565 to the main memory and conversely. The MMU may have a page table 561 in which it stores information from the pages that are in main memory at any given time.

In one implementation, the MMU may be used to convert virtual memory addresses to physical memory addresses in systems using virtual memory.

In some implementations, the MMU may be included within the processor 500.

When the processor 500 wants to read or write a particular memory address in the main memory 590, processor 500 typically begins trying to the data associated with the memory address in the nearest cache, such as the data cache L1 or the instruction cache L1, to determine if said memory address is stored in the L1 cache. If this occurs it is called "cache hit" and the processor 500 reads or writes the details of that memory address in the L1 cache.

When the data from that memory address that the processor 500 wants to read or write is not in the L1 cache, this event is called "cache miss". Then the processor tries to access the next cache level, such as the L2 cache, to check if the L2 cache has the data stored. If data are not in the L2 cache then the processor will access the next cache memory level, such as an L3 or L4 (not shown in FIG. 5) if they are used in the computing system comprising the processor 500.

If the data of the memory address are not found in any of the cache memories, then the data are obtained from main memory 590. There are different algorithms for managing cache memories in order to maximize the cache hit and minimize the cache miss and to maintain data consistency between the various cache memories, such as, for example, the MESI protocol (Modified, Exclusive, Shared and Invalid) and the MOESI protocol (Modified, Owned, Exclusive, Shared and Invalid).

It may also be the case that the memory address that the processor 500 wants to access is not stored in main memory 590, for example in systems using virtual memory. When this happens it is called a "page fault" and the data that the processor wants to read or write must be transferred first to the main memory, for example from a storage device unit 565 such as a hard drive or SSD (Solid State Drive).

In one implementation, by default all the data that the processor reads or writes are written previously in the cache memory, for example in the L1 cache memories.

In computer architecture, instruction prefetch is a technique used in microprocessors to speed up the execution of a program by reducing wait states.

Prefetching occurs when a processor requests an instruction from main memory before it is actually needed. Once the instruction comes back from memory, it is placed in a cache. When an instruction is actually needed, the instruction can be accessed much more quickly from the cache than if it had to make a request from memory.

Since programs are generally executed sequentially, performance is likely to be best when instructions are prefetched in program order. Alternatively, the prefetch may be part of a complex branch prediction algorithm, where the processor tries to anticipate the result of a calculation and fetch the right instructions in advance.

In one implementation, the security component verifies the hash value of the data blocks transmitted to the cache memory during the prefetching. In other implementation, the security component verifies the hash value to the data blocks after the prefetching.

Some processors allow the execution of instructions that can disable or stop the use of cache memory. In one implementation, the processor 500 is manufactured or configured to always use the cache memory and does not allow disabling it.

In one implementation, the security component can detect that a program has some instructions to disable the cache memory use, and the security component does not allow the execution of these instructions, for example by preventing the instructions to be copied in the L1 instruction cache.

In one implementation, the security component may detect that a data block being transferred to the L1 instruction cache comprises instructions to disable the cache and the security component does not allow the data block to be stored in the cache line. This way, the execution of the instructions disabling the cache is not allowed.

In other implementation, the security component does not allow any program, being secure or not, to execute an instruction disabling the use of the L1 instruction cache and/or the L1 data cache. For example, in one implementation, the security component communicates with core 510 to instruct core 510 to allow or not to allow the execution of instructions disabling the cache memory.

In other implementation, the security component stores the memory addresses for which the core 510 can disable the cache memory use, for example memory addresses corresponding to input and output devices.

In other implementation, the processor may use different memory addresses for the main memory and for input and output devices, and core 510 is configured to use the L1 data cache and L1 instruction cache only with the main memory addresses and not with input and/or output device.

In the example of FIG. 5, the security component 550 is shown inside the processor, but others configurations are possible.

In one implementation, the security component 550 may be located outside the processor. In other implementations the security component 550 may be in a cache memory located outside the processor or may be included, for example, inside an external memory controller to the processor, for example inside the MMU (Memory Management Unit) 560.

In other implementation, the security component 550 may be inside the main memory 590. In one implementation, the security component 550 may be divided, for example, in two modules, so that a module may be located inside the processor and other module may be located outside the processor.

Figure 6A:
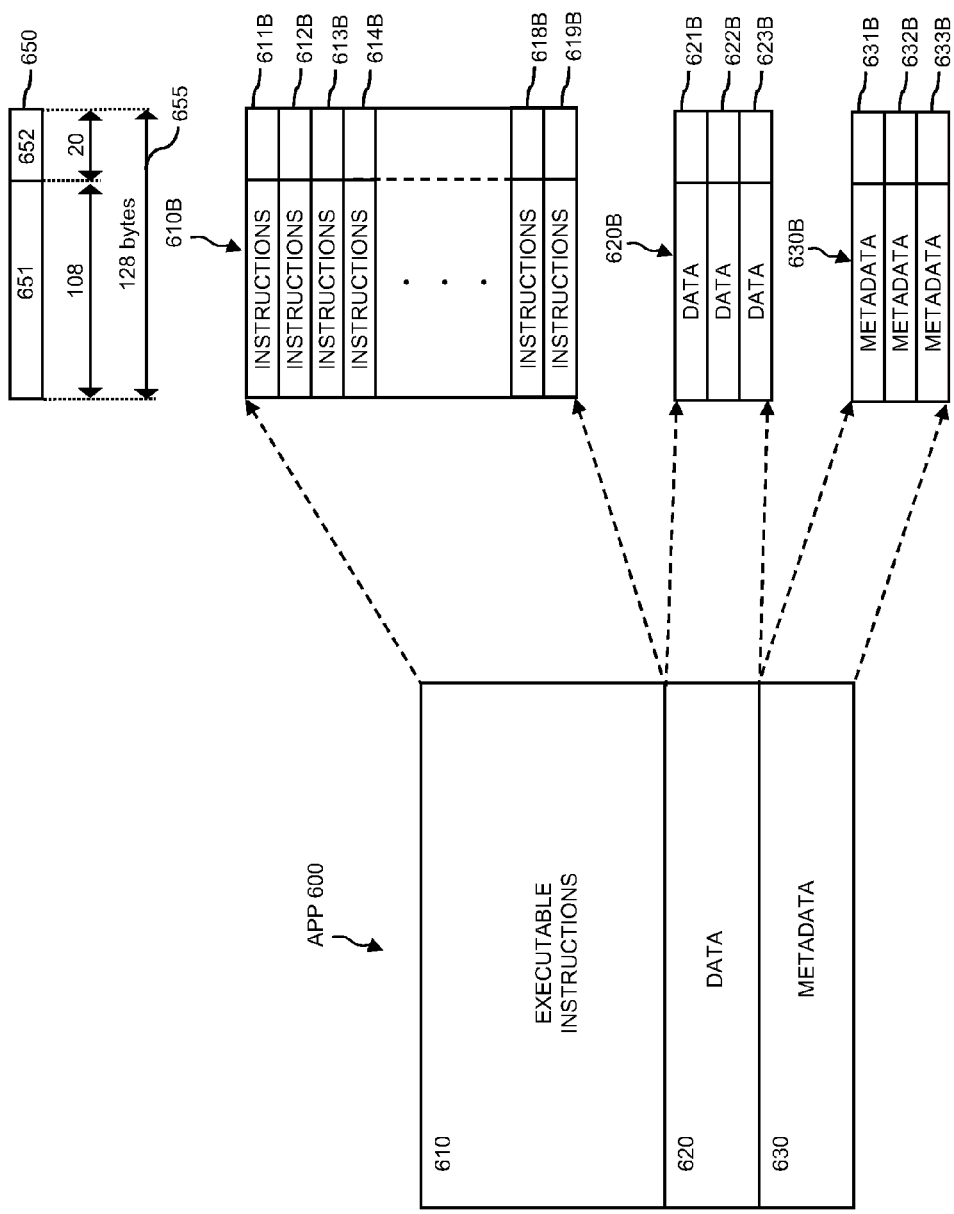
FIGS. 6A and 6B show a structures of a software program.

FIG. 6A shows an example of a software program APP 600 comprising different parts 610, 620 and 630. In one implementation, the program APP 600 comprises executable instructions 610, DATA 620 and METADATA 630. METADATA 630 may contain information about the program 600, such as the program name, version, date it was created, cryptography information and other data.

The format of a software program and their parts may vary depending on the operating system of the computing device where the program is to be executed, the developer tools used to develop the program or the manufacturer or developer who has created the software. The program 600 of FIG. 6A shows three parts although other configurations and/or formats are possible.

The example in FIG. 6A shows the internal format of the parts 610, 620 and 630 that form the program APP 600 through elements 610B, 620B and 630B respectively.

Figure 6B:
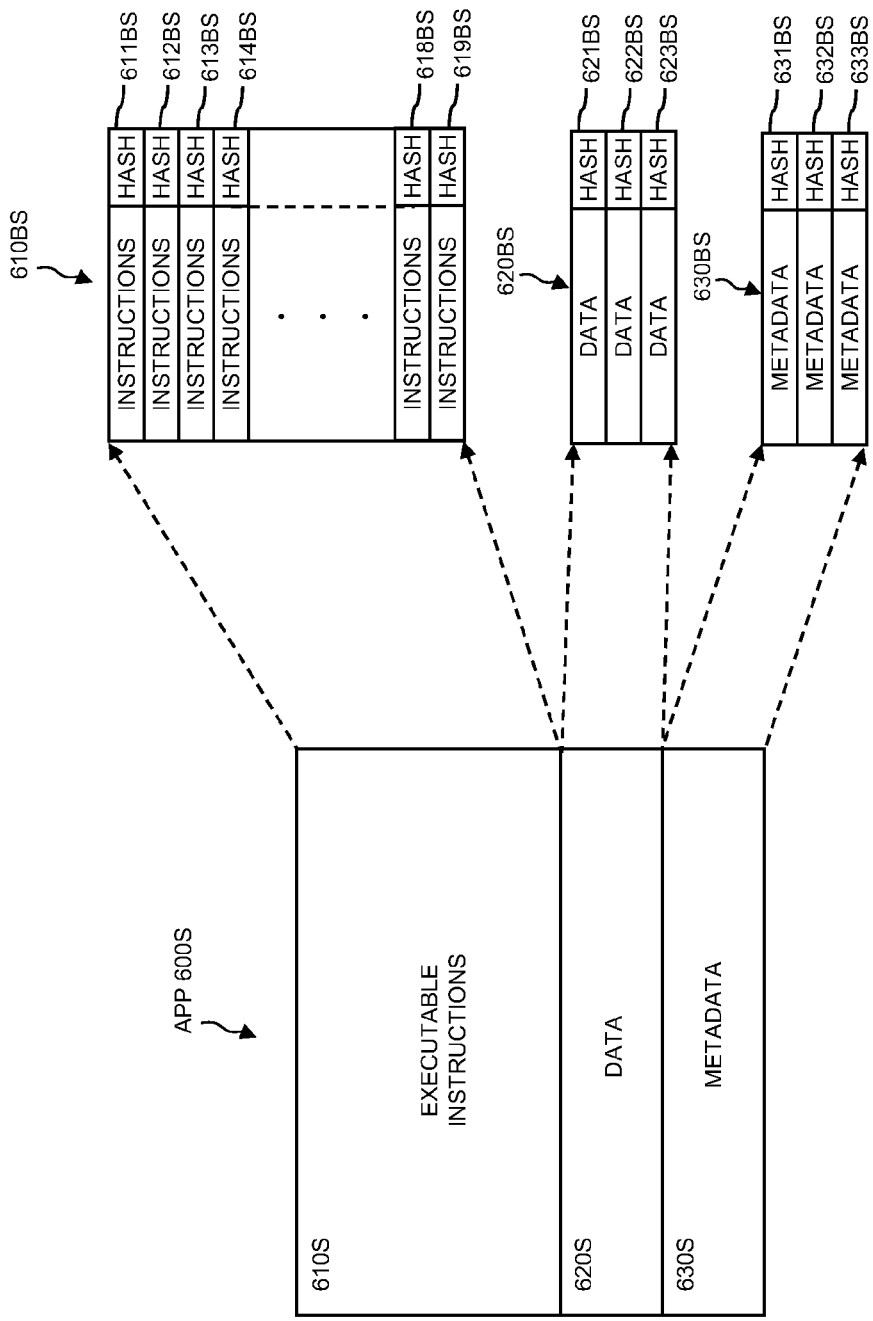

FIG. 6A shows the software program APP 600 before the digital signatures or hash values of each data block have been added, while FIG. 6B shows the software program APP 600S that includes the hash value in parts 610BS, 620BS and 630BS.

In FIG. 6A, element 610B shows an example of the executable instructions 610 of the program APP 600 organized into blocks of 128 bytes comprising 108 bytes of executable instructions and a field of 20 bytes that may store the hash value or digital signature in each of the blocks.

The example in FIG. 6A shows the initial 4 blocks 611B, 612B, 613B and 614B, and the last two blocks 618B and 619B to simplify the figure, since the executable instructions 610 may have a length of several MB or GB organized into thousands or millions of blocks of 128 bytes.

In one implementation, the program data 620 and metadata 630 may also be configured in data blocks like the data block 650, so that they may store hash values for each data block.

In the example in FIG. 6A, element 620B shows an example of the data 620 of the program 600 configured in data blocks of 128 bytes. The element 630B shows an example of metadata 630 of the program 600 configured in data blocks of 128 bytes.

In the example in FIG. 6A the data 620B are shown containing three data blocks 621B, 622B and 623b but different implementations may use a different number of data blocks. FIG. 6A also shows the metadata 630B example composed of three data blocks 631B, 632B and 633B, although other implementations may use a different number of metadata blocks.

In the example of FIG. 6A, the program APP 600 comprises executable instructions 610, however, another type of instructions are possible, such as, for example, interpreted type instructions or bytecode type instructions, as explained later.

In the example of FIG. 6A, the element 650 represent a data block with a size of 128 bytes, as indicated by arrow 655, and comprises a first data block 651 of 108 bytes and a second data block 652 of 20 bytes. The data block 651 may store executable instructions, data or metadata and the data block 652 may store a hash value.

With respect to FIG. 6A the term "data block" to refer to different blocks of 128 bytes. These data blocks may store instructions, data or metadata. Other data block and hash value sizes are possible in other implementations, like for example the data blocks shown in FIGS. 21 and 21B.

The data block 650 of FIG. 6A may be used for example in computers with a cache line size of 128 bytes, for example a L1 instruction cache memory with a cache line of 128 bytes. The cache lines of 128 bytes are common in 64-bit processors.

In the example of FIGS. 6A and 6B, the parts of the program APP 600 and APP 600S which contain the executable instructions, data and metadata, may be configured as data blocks of 128 bytes, similar to the data block 650, having 108 bytes of instructions, data or metadata and hash value fields of 20 bytes.

In some implementations, only the part 610 comprising the executable instructions of the program APP 600 is configured in blocks of 128 bytes like the data block 650. In still another implementation, not all the data in the part 610 of the program is configured in data blocks like the data block 650 but at least a part of the instructions of the part 610 of the program APP 600 are configured in data blocks like the data block 650.

In some implementations, programs may comprise first executable instructions, first data and/or first metadata configured in data blocks comprising hash values and also second executable instructions, second data and/or second metadata that are not configured in data blocks. For example, the second executable instructions may be executed in a core that doesn't have a security component in a processor that has multiple cores, with at least a first core having a security component and at least a second core not having a security component.

The executable instructions 610 or 610S of a program, may not occupy a space that is a multiple of 108 bytes (in this example, 108 bytes is the size of the cache line minus the size of the hash value), so the block corresponding to the last data block of executable instructions may be formed by instruction bytes, padding bytes and the hash value field.

In one implementation, a programmer or developer of the APP 600 may use a computing device executing developer tools having access to a cryptographic key used to generate the hash value for the data blocks of the program APP 600S.

In one implementation the developer tools executing in the computing device, like for example a compiler, may calculate and store the hash values of each data block, generating the program APP 600S that comprises hash values in each data block.

In one implementation, the programmer may use a computing device with developer tools, like for example a compiler, but the computing device does not have access to the cryptographic key to generate the hash value for the data blocks of the program APP 600S, so that the fields of data blocks dedicated to store the hash values may be initially empty (for example storing the value 0 in each byte) in the program APP 600 and the program APP 600 without hash values may be stored in the computing device by the developer tools, for example stored in a disk drive of the computing device.

In one implementation the program APP 600 without hash values may be transmitted from a first computing device to a second computing device, for example using a data network like the Internet, and the second computing device may have access to a cryptographic key to calculate the hash values and may use a program that reads the program APP 600 and generates and stores the program APP 600S comprising the hash values in each data block. The second computing device may also transmit the program APP 600S to other computing devices in a data network like for example the Internet.

When the hash value of each data block is added to the program APP 600 the program APP 600S is generated. FIG. 6B, shows the program APP 600S comprising parts 610BS, 620BS and 630BS.

In the example in FIG. 6B, the elements 610BS, 620BS and 630BS show the data blocks of different parts of the program APP 600S, for example executable instructions 610S, program data 620S and metadata 630S, respectively.

Element 610BS from the example of FIG. 6B shows the initial 4 blocks 611BS, 612BS, 613BS and 614BS, as well as the last two blocks 618BS and 619BS to simplify the figure.

The example in FIG. 6B shows data 620BS comprising three data blocks 621BS, 622BS and 623BS, although different implementations may use a different number of data blocks.

FIG. 6B also shows the metadata 630BS comprising three blocks of data 631BS, 632BS and 633BS although other implementations may use a different number of metadata blocks.

In the example of FIG. 6B the data blocks corresponding to executable instructions 610S, data 620S and metadata 630S include the corresponding hash value for each data block.

Figure 7:
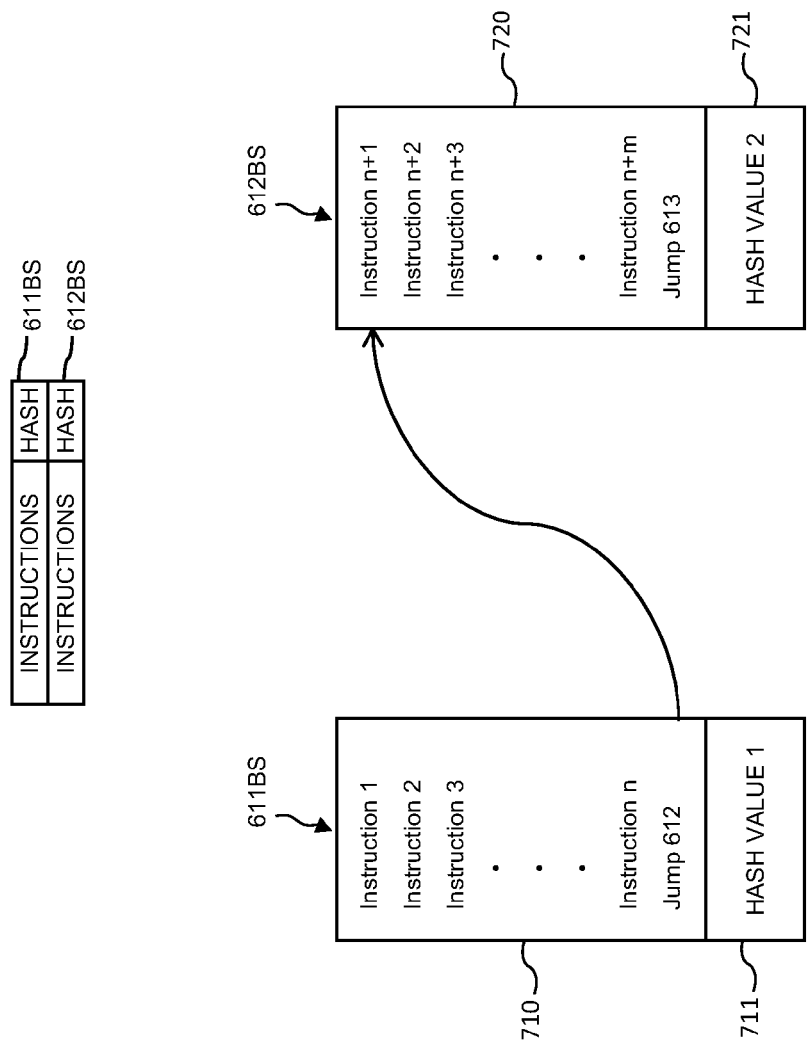
FIG. 7 shows an example of how program instructions may be executed.

FIG. 7 shows an example with two data blocks 611BS and 612BS, each one containing instructions and a hash value.

In some implementations, the executable instructions of a program can be distributed in memory blocks that are not continuous, since each data block includes a hash value that can interrupt the software program instructions.

Elements 710 and 711 of FIG. 7 show the data block 611BS formed by a group of executable instructions 710 ranging from instruction 1 to the instruction Jump 612, occupying the 108 bytes of data block 611BS and hash value 711.

After instruction n there is a jump instruction (Jump 612) to the next instruction, instruction n+1 in the next data block 612BS shown in the figure in detail by the elements 720 and 721.

Thus, in some implementations, the executable instructions of a program may be distributed in memory blocks, for example using a jump instruction. Other instructions may be used to distribute executable instructions in data blocks, for example a "call" instruction in one data block that jumps into the instructions of another data block until the core executes a "return" instruction.

Below is an explanation of hash functions and some type of hash functions called "lightweight hash functions" that may be used in different implementations.

There are many different digital signatures like for example RSA, DSA (Digital Signature Algorithm) and its elliptic curve variant ECDSA, and others.

In one implementation, the security component may use the HMAC protocol (Hash-based Message Authentication Code). HMAC is a protocol designed to calculate the "message authentication code" (MAC) using a cryptographic hash function in combination with a secret key.

Different implementations can use different hash functions such as MD5 or SHA-1 with the HMAC protocol. The result is called algorithm HMAC-MD5 or HMAC-SHA-1 respectively.

The HMAC protocol are described in specifications RFC 2104, "HMAC: Keyed Hashing for Message Authentication," H. Krawczyk et. Al, February 1997, published by IETF and available online.

The MD5 Message Digest Algorithm is a widely used cryptographic hash function that produces a 128-bit (16-bytes) hash value.

RFC 6151 specifications, "Update security considerations for the MD5 Message-Digest and the HMAC-MD5 Algorithm", de S. Turner et. Al., March 2011, published by IETF and available online, update various security aspects of RFC 2104.

SHA-1 is a cryptographic hash function designed by the National Security Agency and published by the NIST as a U.S. Federal Information Processing Standard. SHA stand for Secure Hash Algorithm. The three SHA algorithms are structured differently and are distinguished as SHA-0, SHA-1 and SHA-2. SHA-1 is very similar to SHA-0, but corrects an error in the original SHA hash specification that led to significant weakness. The SHA-0 algorithm was not adapted by many applications. SHA-2 on the other hand significantly differs from the SHA-1 hash function.

SHA-1 is the most widely used of the existing SHA hash functions, and is employed in several widely-used security applications and protocols. In 2005, security flaws were identified in SHA-1, namely that a mathematical weakness might exist, indicating that a stronger hash function would be desirable. Although no successful attacks have yet been reported on the SHA-2 variants, they are algorithmically similar to SHa-1 and also efforts are underway to develop improved alternatives.

SHA-1 produces a 160-bit (20-bytes) hash value on principles similar to those used by Ronald L. Rivest of MIT in the design of the MD4 and MD5 message digest algorithms, but has a more conservative design.

Other version of SHA algorithm generates different hash values, for example SHA256 and SHA512 generate hash values of 256 bits and 512 bits respectively.

A new hash standard, SHA-3, is currently under development—an ongoing NIST hash function competition is scheduled to end with the selection of winning function in 2012.

In some implementations, security component may use hash functions called "Lightweight Hash" that may be implemented with a reduced number of logic gates.

So far, the lightweight hash-type functions have been designed or implemented to the RFID protocol.

The ongoing "SHA-3" Hash Competition organized by NIST has received many different submissions but most of them need more than 10.000 GE (gate equivalents).

The article "QUARK: A Lightweight Hash", Jean-Philippe Aumasson et al., of the book "Cryptographic Hardware and Embedded Systems-CHES 2010", August 2010, published by Springer, describes a new hash function of lightweight hash type and mentions different hash functions and the number of gates equivalents used by each implementation.

The following table shows different hash functions, the number of gates equivalents and the number of bits of the hash value.

| Name | Gate Equivalents (GE) | Bits Hash Value |
| --- | --- | --- |
| CubeHash (2) | 7630 GE in 0.13 µm ASIC | 512 |
| MD5 (3) | 8001 GE in 0.35 µm ASIC | 128 |
| SHA-1 (4) | 6122 GE in 0.18 µm ASIC | 160 |
| MAME (5) | 8100 GE in 0.18 µm ASIC | 256 |
| PRESENT (6) | 1600 GE in 0.18 µm ASIC | 64 |
| QUARK (*) | 2300 GE | 112 |
| U-QUARK (*) | 1379 GE | 64 |
| QUARK (*) | 4500 GE (expected) | 256 |

(2) Bernstein, D. J.: Cubehash specification (2.B.1). Submision to NIST, Round 2 (2009), http://cubehash.cr.yp.to/submission2/spec.pdf
(3) Feldhofer, M., Wolkerstorfer, J.: Strong crypto for RFID tags - a comparison of low power hardware implementations. In: ISCAS, pp. 1839-1842. IEE, Los Alamitos (2007).
(4) O'Neil, M.: Low cost SHA-1 hash function architecture for RFID tags. In: Workshop on RFID Security RFIDsec (2008).
(5) Yoshida, H. et. Al., "MAME: A compression function with reduced hardware requirements. In ECRYPT Hash Workshop (2007)
(6) Bogdanov et. Al., "Hash functions and RFID tags: Mind the gap". In CHES 2008. LNCS, vol. 5154, pp 283-299. Springer, Heilderberg (2008). Bogdanov et. Al., "PRESENT: An ultra-lightweight block cripher". In CHES 2007. LNCS, col. 4727, pp 450-466, Springer, Heidelberg (2007).

The MD5 Message-Digest Algorithm is a widely used cryptographic hash function that produces a 128-bit (16-byte) hash value. MD5 has been employed in a wide variety of security applications, and is also commonly used to check data integrity. However, it has been shown that MD5 is not collision resistant; as such, MD5 is not suitable for applications like SSL certificates or digital signatures that rely on this property. An MD5 hash is typically expressed as a 32-digit hexadecimal number.

MD5 is one in a series of message digest algorithms designed by Professor Ronald Rivest of MIT (Rivest, 1994). MD5 is described in specifications RFC 1321, "The MD5 Message-Digest Algorithm", R. Rivest et al, April 1992, published by IETF and available online at <http://tools.ietf.org/html/rfc1321>.

SHA-1 is described in specifications RFC 3174, "US Secure Hash Algorithm 1 (SHA1)", P. Jones et al, September 2001, published by IETF and available online at <http://tools.ietf.org/html/rfc3174>.

The MESI protocol (known also as Illinois protocol due to its development at the University of Illinois at Urbana-Champaign) is a widely used cache coherency and memory coherence protocol. It is the most common protocol which supports write-back cache. Its use in personal computers became widespread with the introduction of Intel's Pentium processor to "support the more efficient write-back cache in addition to the write-through cache previously used by the Intel 486 processor".

In computing, MOESI is a full cache coherency protocol that encompasses all of the possible states commonly used in other protocols. In addition to the four common MESI protocol states, there is a fifth "Owned" state representing data that is both modified and shared. This avoids the need to write modified data back to main memory before sharing it. While the data must still be written back eventually, the write-back may be deferred.

In cryptography, RSA (which stands for Rivest, Shamir and Adleman who first publicly described it) is an algorithm for public-key cryptography. It is the first algorithm known to be suitable for signing as well as encryption, and was one of the first great advances in public key cryptography. RSA is widely used in electronic commerce protocols, and is believed to be sufficiently secure given sufficiently long keys and the use of up-to-date implementations.

The Digital Signature Algorithm (DSA) is a United States Federal Government standard or FIPS for digital signatures. It was proposed by the National Institute of Standards and Technology (NIST) in August 1991 for use in their Digital Signature Standard (DSS), specified in FIPS 186, adopted in 1993. A minor revision was issued in 1996 as FIPS 186-1. The standard was expanded further in 2000 as FIPS 186-2 and again in 2009 as FIPS 186-3.

DSA is covered by U.S. Pat. No. 5,231,668, filed Jul. 26, 1991, and attributed to David W. Kravitz, a former NSA employee. This patent was given to "The United States of America as represented by the Secretary of Commerce, Washington, D.C." and the NIST has made this patent available worldwide royalty-free. Dr. Claus P. Schnorr claims that his U.S. Pat. No. 4,995,082 (expired) covered DSA; this claim is disputed. DSA is a variant of the ElGamal Signature Scheme.

The Elliptic Curve Digital Signature Algorithm (ECDSA) is a variant of the Digital Signature Algorithm (DSA) which uses Elliptic curve cryptography. As with elliptic curve cryptography in general, the bit size of the public key believed to be needed for ECDSA is about twice the size of the security level, in bits. By comparison, at a security level of 80 bits, meaning an attacker requires about the equivalent of about 280 signature generations to find the private key, the size of a DSA public key is at least 1024 bits, whereas the size of an ECDSA public key would be 160 bits. On the other hand, the signature size is the same for both DSA and ECDSA: 4t bits, where it is the security level measured in bits, that is, about 320 bits for a security level of 80 bits.

Figure 8:
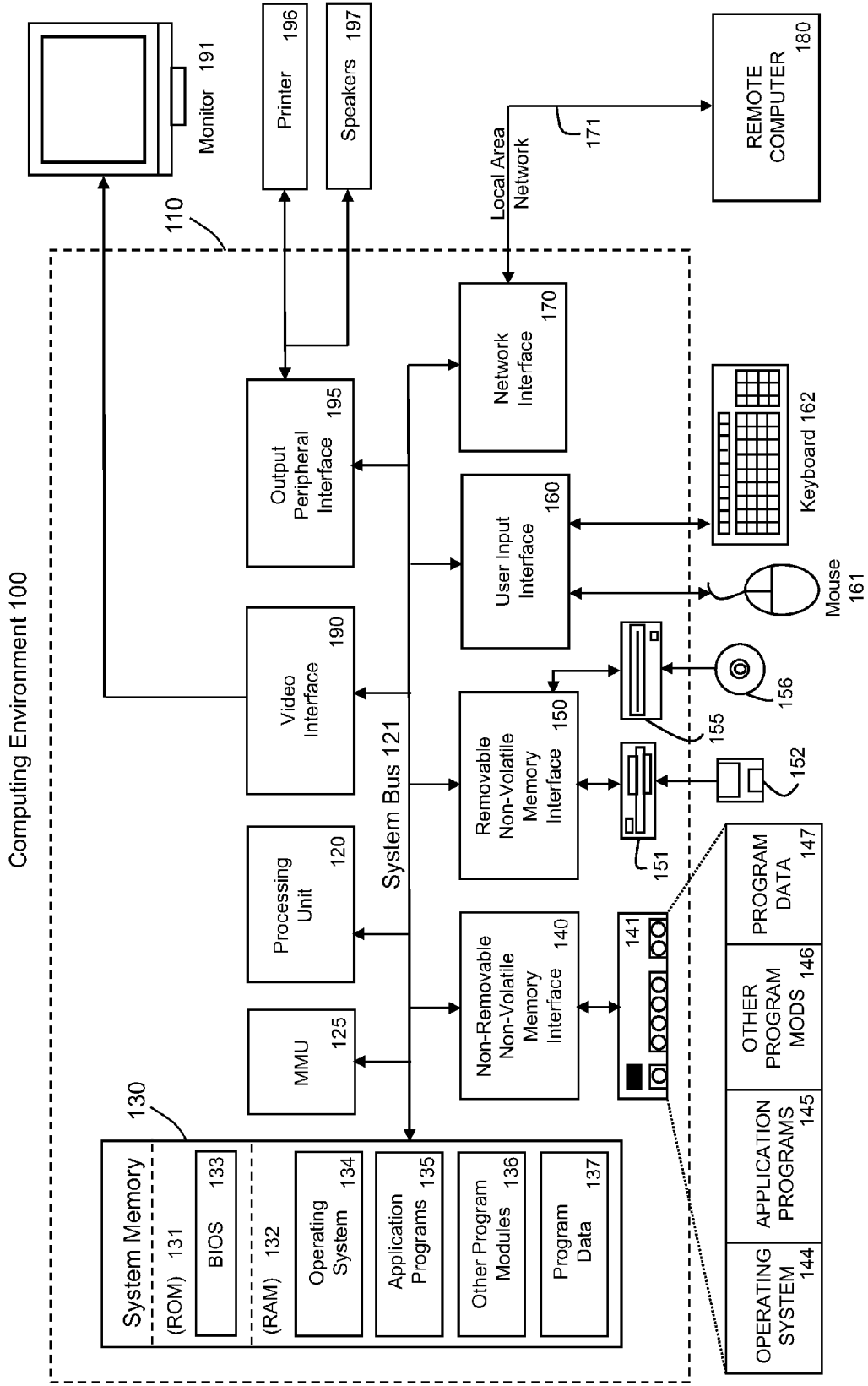
FIG. 8 shows an example of computer system/computing environment.

FIG. 8 shows a diagram of an exemplary computer system 100 in which different implementations can be implemented. The computer system 100 is just one example of a suitable computing environment and does not suggest or imply any limitation on the scope of use or functionality of the different implementations. Similarly, the computer system 100 should not be interpreted depending upon or based on the requirements of any combination of components illustrated in the example in FIG. 8. Other ways of implementing a computer system 100 may also be appropriate for different implementations.

Different implementations are functional with many other configurations or computer systems with a general or special purpose. Examples of configurations or known computer systems which may be appropriate for using the different implementations include, without limitation, personal computers, portable computers or devices, multiprocessor systems, microprocessor-based systems, set-top-boxes, televisions, programmable consumer devices, network computers, minicomputers, mainframes, distributed computing systems that include any of the previously mentioned systems or devices or the like.

In the example in FIG. 8, the system includes a general purpose computing device in the form of computer 110. Components of computer 110 may include, without limitation, a processing unit 120, a system memory 130, a system bus 121 that connects various system components including the system memory to the processing unit 120. The system bus 121 can be any type of bus structure including a memory bus or memory controller, a peripheral bus, and/or a local bus using a variety of bus architectures. By way of example and without limitation, such architectures include Industry Standard Architecture (ISA), Micro Channel Architecture (MCA), Enhanced ISA (EISA), Video Electronics Standards Association (VESA), and Peripheral Component Interconnect (PCI) (also known as Mezzanine bus).

The computer 110 typically includes a variety of computer readable media. Computer readable media can be any available media that can be accessed by computer 110 and includes volatile and non-volatile, and removable and non-removable media. By way of example and without limitation, computer readable media may include computer storage media and communications media. Computer storage media include volatile and non-volatile, and removable and non-removable media, implemented with any method or technology for information storage such as readable computer instructions, data structures, program modules or other data.

Computer storage media include, without limitation, RAM, ROM, EEPROM, flash memory or other memories, CDROM, DVD (Digital Versatile Disks) or other storage means on optical disks, magnetic cassettes, magnetic tapes, magnetic disk storage media or other magnetic storage devices, or any other medium which can be used to store the desired information and which can be accessed by computer 110.

The communications media typically include computer readable instructions, data structures, program modules or other data in a modulated data signal such as a carrier wave or other transport mechanism and includes any means of distributing information. The term "modulated data signal" means a signal that has established or changed one or more of its characteristics so that it encodes information in the signal. By way of example and without limitation, communications media include wired media such as a wired data network or a direct cable connection, and wireless media such as acoustic, RF, infrared and other wireless media. Similarly, any combination of the elements previously mentioned may be included within the scope of the computer readable media definition.

The system memory 130 includes computer storage media in the form of volatile memory and/or non-volatile memory such as read-only memory (ROM) 131 and random access memory (RAM) 132. A basic input/output system 133 (BIOS), containing the basic routines that help transfer information between elements included in the computer 110, for example at start-up, it is typically stored in ROM 131. RAM 132 typically contains data and/or program modules that are immediately accessible and/or being used by the central processing unit 120. By way of example and without limitation, FIG. 8 shows an operating system 134, programs or applications 135, other program modules 136 and program data 137.

The computer 110 may also include other removable/non-removable, volatile/non-volatile storage media. By way of example, FIG. 8 illustrates a hard disk drive 141 that reads or writes to a non-removable and non-volatile magnetic media, a magnetic disk drive 151 that reads or writes to the removable and volatile magnetic disk 152, and an optical disk drive 155 that reads or writes to a removable and non-volatile optical disk 156, such as a CD ROM or other optical media.

Other removable/non-removable, volatile/non-volatile storage media which can be used in the system shown in FIG. 8 include, without limitation, magnetic tapes, flash memory cards, DVD (Digital Versatile Disks), digital Video tapes, solid state RAM, solid state ROM and the like. The hard disk drive 141 is typically connected to the system bus 121 through a non-removable memory interface such as interface 140, and the magnetic disk drive 151 and optical disk drive 155 are typically connected to the bus system 121 via a removable memory interface such as interface 150.

The units and their associated storage computer media described above and illustrated in FIG. 8 provide storage for computer readable instructions, data structures, the program modules and other data for computer 110. FIG. 8, for example, shows the hard disk drive 141 storing operating system 144, programs or applications 145, other program modules 146 and program data 147. Note that these components can be the same as or different from the operating system 134, programs or applications 135, other program modules 136 and program data 137. The operating system 144, programs or applications 145, other program modules 146 and program data 147 are indicated with different numbers to illustrate that at least they are different copies. The applications or other computer program modules 110 may contain, among other things, computer instructions that when executed, cause the system to operate or perform functions.

A user can enter commands and information into the computer through input devices such as keyboard 162 and pointing device 161, commonly referred to as a mouse, trackball or touch pad. Other input devices (not shown) may be a microphone, joystick, game pad, satellite dish, scanner, or similar devices. These and other input devices are often connected to a processing unit 120 through an input interface 160 that is connected to the system bus, but may be connected to other interfaces and bus structures, such as a parallel port, a game port or a USB (Universal Serial Bus). The monitor 191 or other display device is also connected to the system bus 121 via an interface, such as the video interface 190. In addition to the monitor, computers may also include other peripheral output devices such as speakers 197 and a printer 196, which may be connected through an output peripheral interface 195.

The computer 110 operates in a networked environment using logical connections to one or more remote computing devices 180. Remote computing devices 180 may be a personal computer, a server, a router, a network PC, a "peer" device or other common network nodes and typically include some or all of the elements described above relative to computer 110. Logics connections shown in FIG. 8 include a local area network (LAN) 171, but may also include other networks. Such networking environments are often used in offices, enterprise computer networks, intranets and the Internet.

The network interface 170 provides an interface to external networks, which may include multiple computer systems or devices and communication links as described above. These communication links may be wired links, optical links, wireless links or any other mechanism for information communication. In one implementation, network 171 supports the Ethernet protocol when the network interface is connected to a local area network environment (LAN). The network interface 170 may take different forms, including a network card that is installed inside the computer 110 or an embedded component or chip that is part of the computer 110, or may be part of another component, such as the motherboard or an expansion card. In one implementation described in more detail below, the network interface is implemented as part of the chipset of the computer 110.

FIG. 8 also shows a MMU 125 (memory manager unit) that manages access to memory 130. Later the different implementations that may use different types of MMU are explained.

In some implementations, the processor may comprise at least one core having a security component and at least another core not having a security component. Some implementations may have more than one processor, for example a first processor with core or cores having security components and a second processor with core or cores not having security components.

Figure 9:
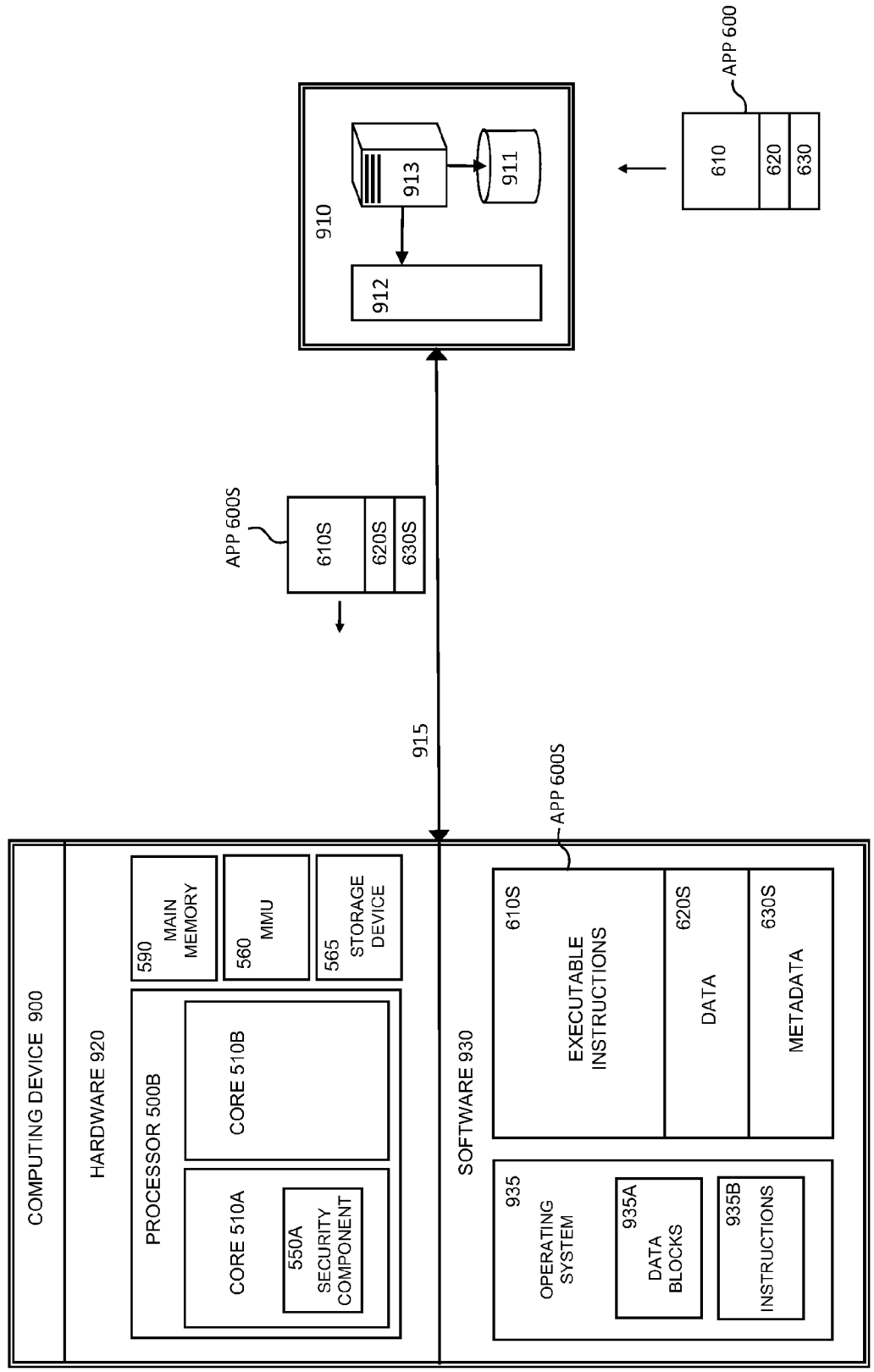
FIG. 9 shows a system according to one implementation.

FIG. 9 shows an example of a computing device 900 having one processor 500B that comprises a first CORE 510A having a security component and a second CORE 510B not having a security component. Both cores may have cache memory, for example an L1 instruction cache and a L1 data cache not shown in FIG. 9 for the purpose of simplicity.

The hardware and the software of the computing device 900 are represented in simplified form by elements 920 and 930, respectively. But hardware 920 and software 930 may include any other element of hardware and/or software like, for example, any element shown in FIG. 8.

In one implementation, all applications and all executable instructions used in the computing device 900 are organized into data block similar to those shown in FIG. 6B.

In one implementation, the processor 500B does not execute any instruction stored in a cache line of a L1 instruction cache if the cache line does not store a correct hash value. This implementation may offer maximum security but also the difficulty of installing applications on the computing device 900 or using old applications.

In one implementation, the core or cores may execute instructions stored in the L1 instruction cache whether they have a hash value or not. This may reduce the security but increases the flexibility of the computing device 900 to install and execute software, like for example old software.

For example, in FIG. 9 the processor 500 has a first core 510A having a security component 550A to execute the instructions stored in data blocks having a hash value and may use a second core 510B not having a security component to execute instructions not stored in data blocks with hash values.

In one implementation, for example the operating system and applications with most critical functions, such as those related to security and communications, may comprise instructions organized in data blocks with hash values, while other applications may be executed without using data blocks with hash values.

In one implementation the operating system has a table indicating which program applications use data blocks with hash values and which do not. In one implementation this table has also an associated hash value or digital signature to prevent it from being altered.

In some implementations, the operating system may store a table identifying the process and threads, for example process or threads that are being executed in a multi-core processor, that have their executable instructions stored in data blocks having hash values.

In one implementation the operating system chooses the core or cores in which each program application, each process and/or each thread is going to be executed, selecting the cores having a security component to execute the instructions stored in data blocks with hash values and selecting the cores not having a security component to execute the instructions not stored in data blocks having hash values.

In the example of FIG. 9, the hardware 920 comprises elements similar to the elements described in FIG. 5 like the security component 550A, the main memory 590, a MMU 560 and a storage device 565.

Software 930 being executed in the computing device 900 may comprise the operating system 935 and some software applications like APP 600S, which for example may be transmitted to the computing device 900 from a system 910.

In the example of FIG. 9 the operating systems may comprise first programs or processes 935A having instructions stored in data blocks with hash values and second programs or processes 935B having instructions that are not stored in data blocks with hash values.

In some implementations, the operating system may have a program loader used to execute programs, process or thread and the program loader is capable of detecting if the instructions of a program, a process or a thread are stored in data blocks having hash values and the program loader may select a different core to execute each program, process or thread depending on if they have their instructions organized in data blocks with hash values or not.

In one implementation, the operating system 935 may select the first core 510A that has a security component 550A to execute the instructions stored in data blocks having hash values, like for example the instructions of the part 935A of the operating system 935.

In one implementations, the operating system 935 may select the second core 510B that doesn't have a security component to execute the instructions not stored in data blocks having hash values, like for example the instructions of the part 935B of the operating system 935.

In some implementations, the operating system may read information stored in the metadata of a program application to decide in which core or cores the different parts of a program may be executed.

In one implementation, the operating system is configured to execute certain program, process and/or threads of the operating system always in the core or cores having a security component, for example the parts of the operating system that are related with booting the computing device, security, cryptography, communications, memory management, the program loader, and other parts of the operating system.

In the example of FIG. 9, the software may comprise one or more applications, for example APP 600S which contains executable instructions 610S, data 620S and metadata 630S. The instructions 610S may comprise data blocks comprising instructions and hash values, and the computing device 900 may execute this instructions in the CORE 510A having a security component.

FIG. 9 also shows a system 910 comprising a server 913, a database 911 and an application 912. The system 910 may communicate with the computing device 900 via the communication 915, for example using a data network like the Internet.

Figure 10:
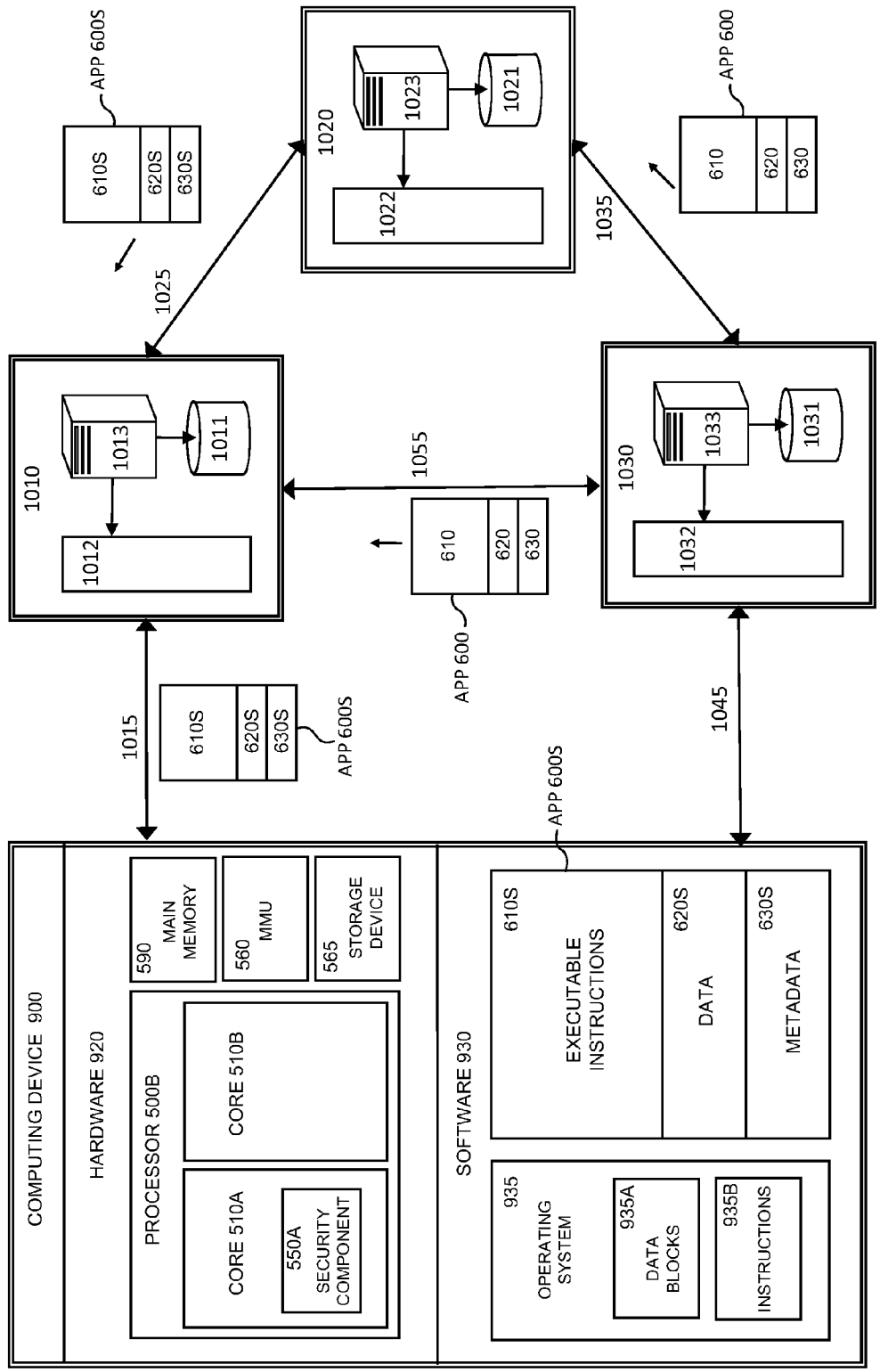
FIG. 10 shows a system according to one implementation.
Figure 13:
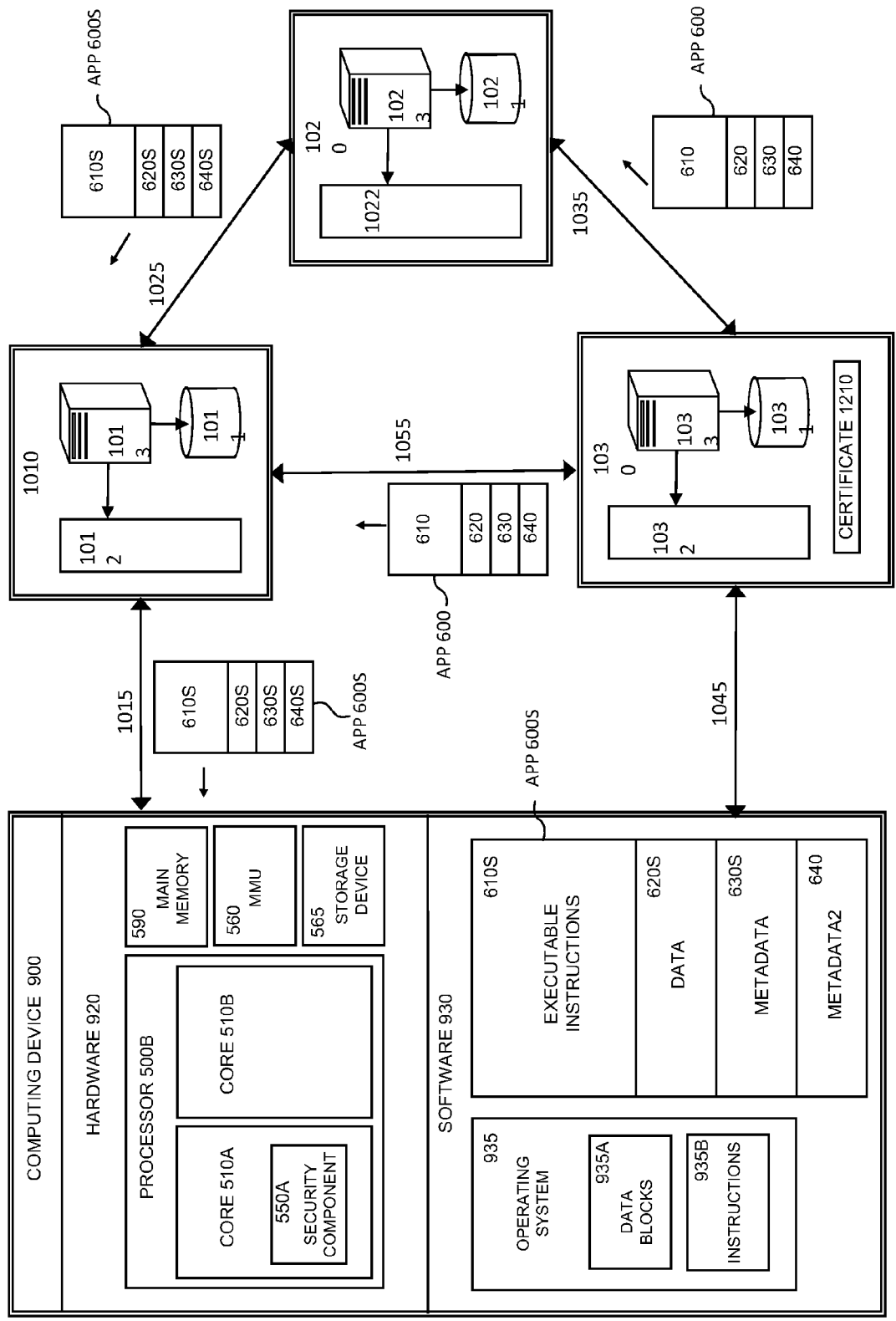
FIG. 13 shows an example of a computing device and a site in a software application that uses a certificate.

The term "system" used in the explanation of FIGS. 9, 10 and 13, as well as other implementations, refers to a computer or group of computers and other electronic equipment such as routers, switches, firewalls, databases, etc. that may be connected to one or more data networks, for example data networks inside the system, or data network outside the system, and are able to exchange information and services with other systems and/or computing devices through data networks. When the external data network connecting the systems is the Internet, the systems may have associated one or more IP addresses, for example IPv4 or IPv6 addresses, and one or more URI (Uniform Resource Identifier) to identify resources and services of the systems or systems to other computing devices and/or other systems without needing to know the IP address of the internal resources and/or services in the system in numerical form.

Communications between a system and another device and/or site may use different protocols such as IPv4, IPv6 TCP/IP, UDP, RTP, RTSP, HTTP, HTML, HTML5, JavasScript, HTTPS, MOBILE IPv4, MOBILE IPv6, IPSEC, SNMP, SOAP, XML, IGMP, and others.

For example a system may be a single server or a may be a data center with hundreds or thousands of servers, routers, firewalls, and other communication equipment and connected to the Internet. In another example a system may comprise more than one data center.

In one implementation, the system 910 stores cryptographic keys corresponding to keys stored inside the processor, for example cryptographic keys stored in the KEYS memory within the security component.

In some implementations using symmetric cryptography, the system 910 may store a secret key and the same secret key is stored inside the processor 500B, for example inside the security component 550A.

In some implementations using asymmetric cryptographic, the system 910 may store a pair of cryptographic keys called PUBLIC KEY and PRIVATE KEY, and the processor 500B may store the PUBLIC KEYS corresponding to the PRIVATE KEYS, for example inside the security component 550A.

If the processor 500B stores also the PRIVATE KEY, for example in the KEYS memory inside the security component 550A, it may be a risk that the PRIVATE KEYS may be compromised or read from an attacker using laboratory equipment to read the data directly from the chip including the security component or the memory storing the keys, in a similar way that the data may be read using laboratory equipment from hard disk drives after deleting the data and overwriting it many times.

In some implementations the processor stores the PRIVATE KEY corresponding to PUBLIC KEYS. In other implementations the processor does not store the PRIVATE KEY corresponding to a PUBLIC KEY. Other combinations are possible and the processor may store or not store the PRIVATE KEY corresponding to a PUBLIC KEY depending on the key pair.

In some implementations, the hash values may be computed using both a secret key using a symmetric cryptographic algorithm and a private key using an asymmetric algorithm.

In one implementation, the database 911 can store thousands or millions of registers with different cryptographic information associated with different users or entities.

In one implementation, the secret keys pair and/or the key pairs comprising a private key and a public key may be stored in the database 911 of system 910 in registers comprising some or all of the following information:

IDKEY
ID_symmetric_algorithm
ID_asymmetric_algorithm
SECRET_KEY (for symmetric cryptographic algorithm)
PRIVATE_KEY (for asymmetric cryptographic algorithm)
PUBLIC_KEY
ID_user
User_Name
User_Password Where:

IDKEY is a unique identifier that identifies the register storing the cryptographic information.

ID_symmetric_algorithm is a unique identifier that identifies the type of symmetric cryptographic algorithm used to calculate the hash values. A value 0 may be used to indicate that no symmetric algorithm is used and only an asymmetric cryptographic algorithm is used.

ID_asymmetric_algorithm is a unique identifier that identifies the type of asymmetric cryptographic algorithm used to calculate the hash values or digital signatures. A value 0 may be used to indicate that no symmetric algorithm is used and only a symmetric cryptographic algorithm is used.

SECRET_KEY is the secret key used with a symmetric cryptographic algorithm.

PRIVATE_KEY and PUBLIC_KEY are the key pair used with an asymmetric cryptographic algorithm.

ID_user, User_Name and User_Password are fields that identifies each user that may use the system 910 to obtain cryptographic keys and/or to send programs to the system 910 to be secured adding the hash values in the system 910.

In one implementation the system 910 may receive a program APP 600 from a registered user or entity and the system 910 may calculate the hash values for the data blocks of the program APP 600, generating the program APP 600S that may be transmitted and executed in a computing device, like the computing device 900 in FIG. 9

In some implementations, the system 910 keeps secret the private keys used to generate hash values.

In one implementation, a computer of user or a entity registered in the system 910 may receive the cryptographic information, like for example information comprising at least a part of the following information:

IDKEY
ID_symmetric_algorithm
ID_asymmetric_algorithm
SECRET_KEY (for symmetric cryptographic algorithm)
PRIVATE_KEY (for asymmetric cryptographic algorithm)
PUBLIC_KEY
ID_user
User_Name
User_Password In one implementation, the user's computer may use this cryptographic information to generate the hash values for each data block of the program APP 600, generating the program APP 600S that may be transmitted and/or executed in computing devices, like for example the computing device 900 in FIG. 9.

In one implementation at least a part of this fields, for example the field IDKEY may be stored in the metadata 630S of software APP 600S. For example such information can be included in a digital certificate included in the metadata 630S.

In one implementation, the security component may store the cryptographic information associated with each register IDKEY, like for example SECRET_KEY and PUBLIC_KEY, and the security component may use this information stored inside the security component to execute the algorithms in the crypto module to calculate or verify hash values.

In one implementation the KEYS memory may be located inside the security component 550A in the processor 500B and may include a flash memory capable of storing several MB or GB of data and can also store thousands or millions of registers with cryptographic information, like for example registers comprising at least a part of the following information:

IDKEY
ID_symmetric_algorithm
ID_asymmetric_algorithm
SECRET_KEY
PRIVATE_KEY_PUBLIC_KEY
ID_user Using this information stored inside the security component, the crypto module may verify the hash values in the data blocks comprising instructions and hash values, before allowing the core to execute the instructions stored in the cache lines of L1 instruction cache as previously explained.

In one implementation the core 510A may read the cryptographic information stored in the metadata 630S and may transmit this cryptographic information to security component but the core 550A or the processor 500B are not capable or reading or storing information inside the security component. In some implementations, the core 510A may use some specific cache line of its L1 data cache to store this cryptographic information and the security component is able to read these specific cache lines.

Although FIG. 9 shows an example of an implementation with a first core 510A having a security component 550A and a second core not having a security component, other implementations are possible In one implementation, a computing device has a processor with one or more cores having security components and all the instructions that are loaded into the L1 instruction cache of any of the cores are organized in data blocks comprising a first part with instructions and a second part with a hash value. This implementation provides maximum security as no instruction can be executed in the processor if the instruction cache line does not contain a hash value.

FIG. 10 shows an implementation in which there are various systems 1010, 1020 and 1030 that may communicate with each other via data networks, like for example the Internet.

FIG. 10 shows the communication between different systems and the computing device 900 through lines 1015, 1025, 1035, 1045 and 1055.

In the example of FIG. 10, the system 1010 is a software application store where users may buy and/or download software using their computing devices, like for example the system of Apple "App Store". Usually an application software store may sell software from hundreds or thousands of software developers companies.

The system 1030 may be a system of a software developer company that may communicate with other systems like for example system 1010 and/or system 1020, and may also communicate with the computing device 900.

In one implementation, the system 1030 may be any computer capable to receive cryptographic information from the system 1020 or the system 1010 and capable to transmit and application program to system 1020, or directly to the system 1010.

In one implementation the system 1020 may be an intermediary system that may be used by software development companies willing to sell their software products in the software application store 1010.

In one implementation, the system 1020 is a system associated with the software application store 1010 and may be used for different processes associated with the sell of software products in the software application store 1010, like for example the process of registering the software companies, assigning a unique identifier to each software company, assigning a unique identifier to each product of each software company, approving the application programs before they are offered for sale in the software application store 1010, transmitting a certificate to each software company, transmitting cryptographic keys to each software company and other processes.

In one implementation, the system 1020 and the system 1010 may be part of the same system 1010 and 1020. In one implementation system 1010 and 1020 may use different URI (Uniform Resource Identifier) to access resources in 1010 and 1020.

In one implementation the system 1020 doesn't exist and all their processes are executed in the system 1010.

In one implementation, the system 1020 may be a third party that does not belong to the entity using the system 1010 nor the entity using the system 1030.

Each of the systems 1010, 1020 and 1030 may comprise one or more computing devices. In the example of FIG. 10, the systems 1010, 1020 and 1030 comprise a server 1013, 1023 and 1033, respectively, a database 1011, 1021 and 1031, respectively, and an application program 1012, 1022 and 1032, respectively.

In one implementation, the developer system 1010 may receive from the intermediary system 1020 cryptographic information, like for example a secret key that may be used with symmetric cryptographic algorithms, a pair of public keys comprising a private key and a public key that may be used with asymmetric cryptographic algorithms, a digital certificate or other type of cryptographic information.

In one implementation, the software developer 1030 develops an APP 600 with instructions organized in data blocks that doesn't have the hash values stored in each data block, as in the example in FIG. 6, and transmits the APP 600 to the intermediary site 1020.

In one implementation, the intermediary site 1020 receives the APP 600 from the system 1030. Then the system 1020 selects a cryptographic key associated with the software developer company using the system 1030 and selects a cryptographic algorithm and calculates the hash value of each of the data blocks of application APP 600 generating the application APP 600S, for example an application similar to that shown in FIG. 6B.

In one implementation, the system 1020 may assign different keys to each software company, for example different PRIVATE KEY, PUBLIC KEY pairs, or different certificates.

In one implementation, the system 1020 may include as metadata 630S of the application APP 600S the IDKEY identifier that identifies a key pair PRIVATE KEY, PUBLIC KEY and an identifier that identifies the algorithm used to calculate the hash values in the application APP 600S.

In one implementation, the application store 1010 receives from the intermediary site 1020 the application APP 600S through communication 1025.

In another implementation, the system 1030 may receive the cryptographic information from the system 1020 and the system 1030 may calculate the hash values and generate the application APP 600S. The system 1030 may transmit the application APP 600S to the system 1020 or directly to the system 1010.

When the computing device 900 requests a download of APP600, the application store 1010 may transmit the application APP 600S to computing device 900 through communication 1015.

Figure 11:
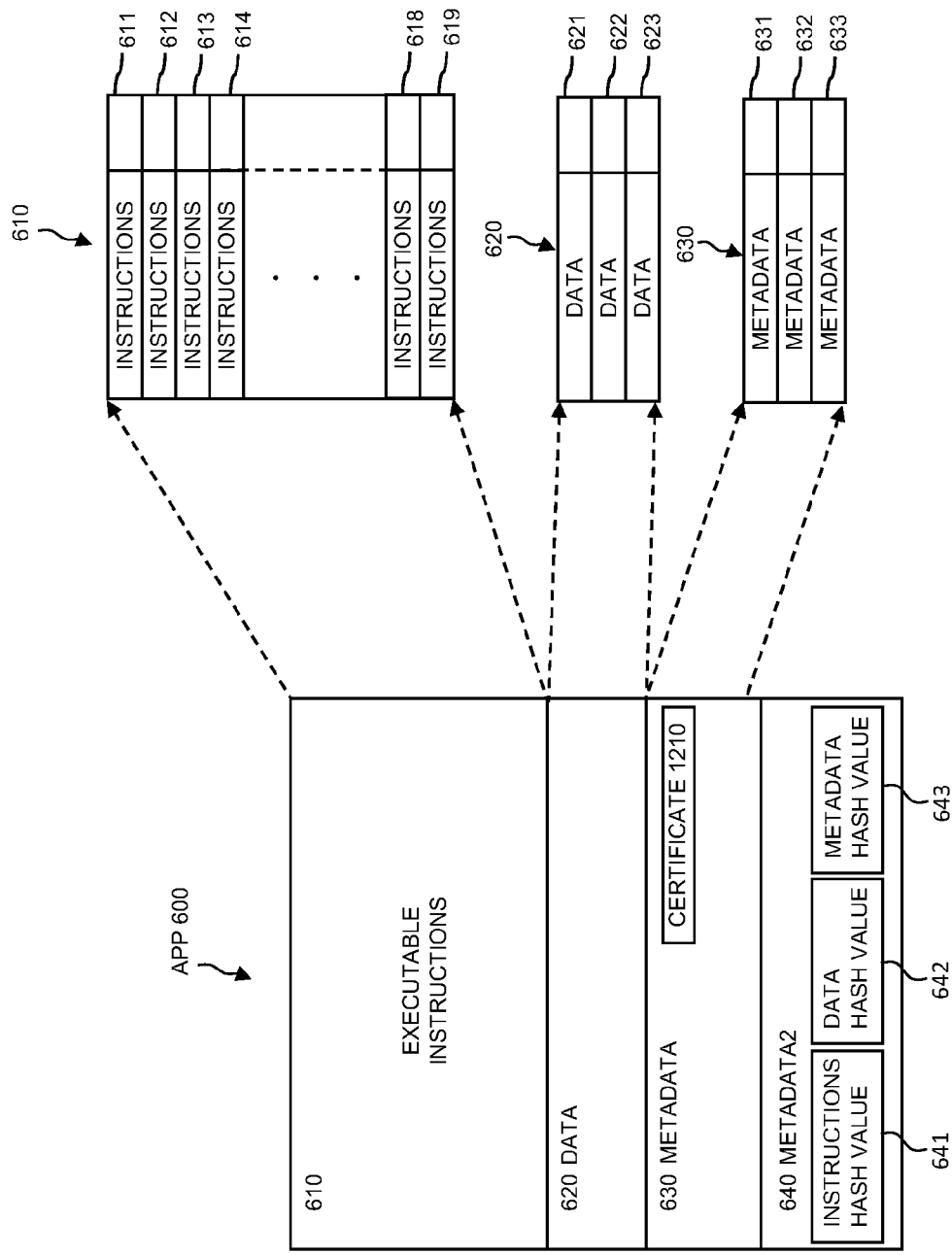
FIG. 11 shows an example of a software program that includes a certificate.

The example in FIG. 11 shows an implementation where the software program APP 600 includes a digital certificate 1210 which may be used in the system 1030 to calculate three digital signatures 641, 642 and 643 for parts 610, 620 and 630 of the program 600.

In one implementation, the digital certificate 1210 may be generated in the system 1020 and transmitted to system 1030. The system 1020 may also transmit to the system 1030 a private key associated with digital certificate.

In another implementation, the digital certificate 1210 may be generated by another system not shown in FIG. 10, like for example the system of a Certification Authority, and may be transmitted to the system 1030.

The digital certificate may comprise a public key associated with the private key received from system 1020. Using the private key, the system 1030 may generate digital signatures of data, like for example the parts of program APP 600, and the digital signatures may be verified using the public key included in the certificate 1210.

For example, three electronic signatures are generated in the system 1030 and stored in part 640 of APP 600 called metadata2 in FIG. 11. This implementation allows to identify and to verify who is the developer of a software application program, for example, when the application is transmitted to the system 1020.

Figure 12:
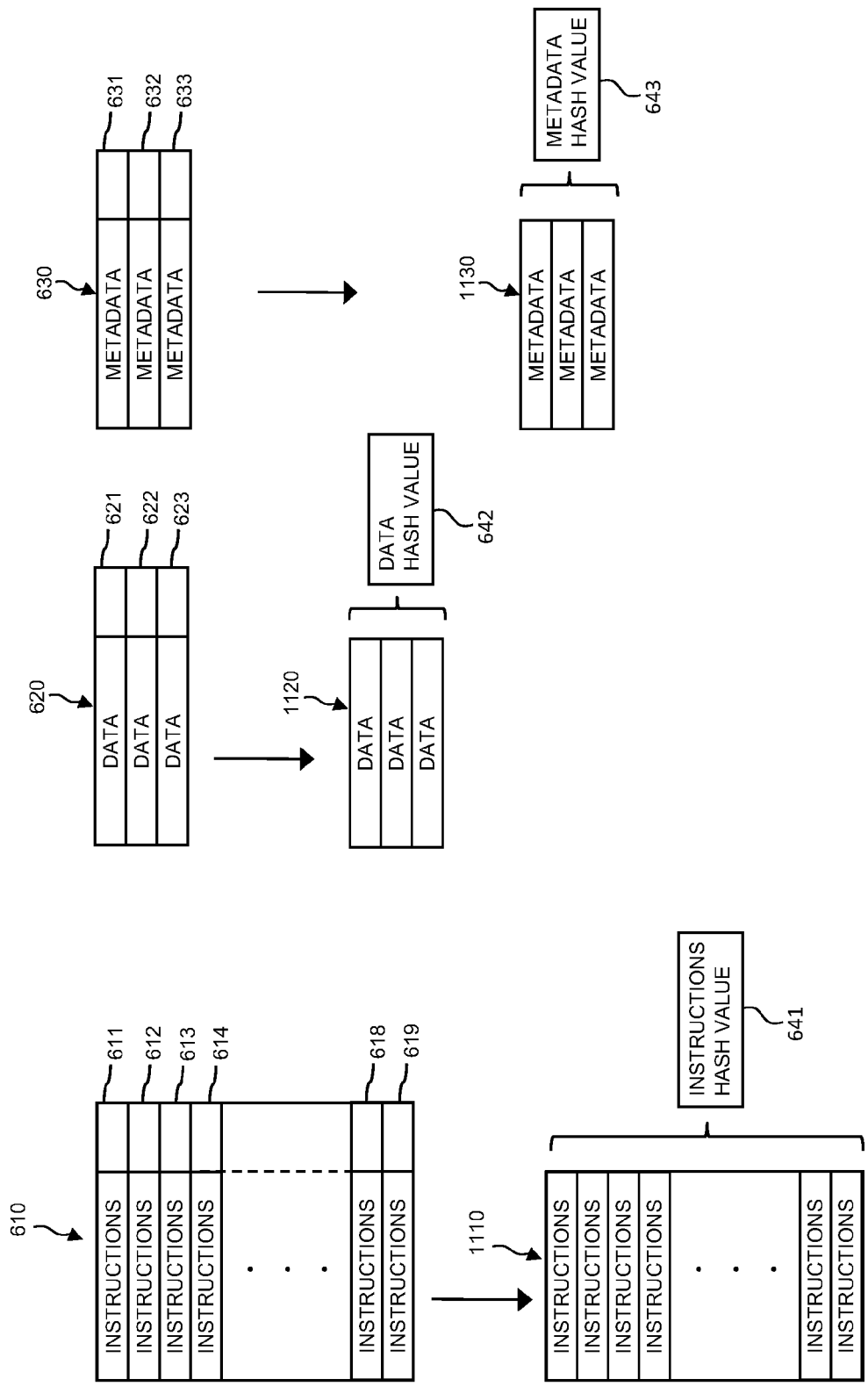
FIG. 12 shows an example of hash values.

In one implementation, the digital signatures 641, 642 and 643 are calculated without taking into account the bytes for the hash values of each data block. This is shown in FIG. 12. In another implementation, the bytes of the hash values may store the value 0 when the digital signatures are calculated.

The example of FIG. 12 shows an example of how to calculate the digital signatures 641, 642 and 643.

To calculate the digital signature 641 of the first part 610 of the APP 600, only data 1110 of the first part 610 of the software program 600 may be used in the cryptographic algorithm.

Similarly, to calculate the digital signatures 642 and 643, only the data 1120 and 1130, respectively, may be used, not using in the cryptographic algorithm to calculate the digital signatures the bytes that will subsequently store the hash values of each data block.

FIG. 13 shows an implementation in which there are several sites 1010, 1020 and 1030 that communicate with each other via data networks, for example through the Internet.

FIG. 13 shows the communication between different sites and the computing device through communications 1015, 1025, 1035, 1045 and 1055.

FIG. 13 shows an implementation that may use digital certificates.

In the example of FIG. 13 the system 1020 receives, for example from the developer system 1030, the application APP 600 that includes the certificate 1210 and metadata2 640 that may include the instruction digital signatures 641, 642 and 643 corresponding to parts 610, 620 and 630 respectively of the application program APP 600.

In one implementation, the system 1020 may verify that the APP 600 has been developed by the developer system 1030 by verifying the digital signatures 641, 642 and 643.

In FIG. 13, the system 1020 may generate the APP 600S comprising the hash values in each data block in a similar way as described above in FIG. 10 and transmits it to the application store system 1010 where it can be downloaded by many computing devices.

Although FIGS. 10 and 13 show a single developer system 1030 to simplify the figures, different implementations may operate with many developer systems 1030, many application stores 1010 system and/or various systems 1020.

In one implementation, the computing device 900 uses the public key included in the digital certificate 1210 to verify that the electronic signatures 641, 642 and 643 included in the metadata2 640 are correct before installing the APP 600S in the computing device.

Figure 14:
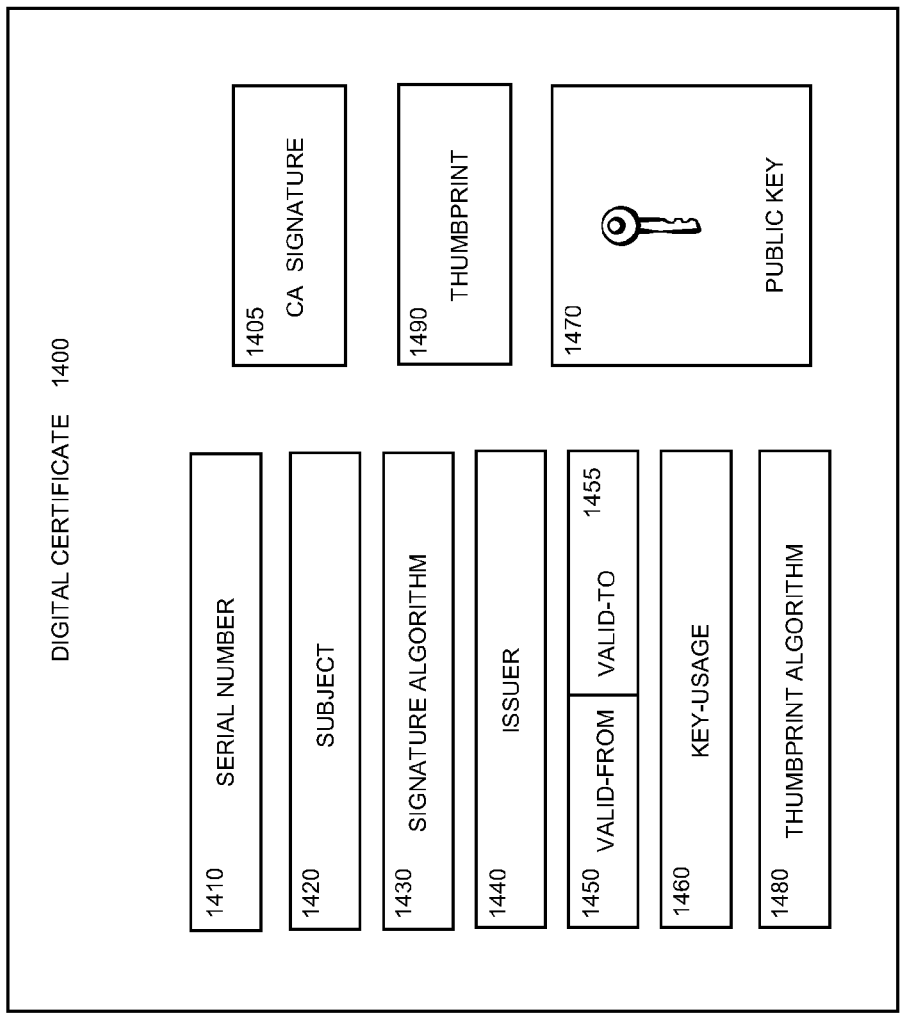
FIG. 14 shows an example of a digital certificate.

FIG. 14 shows an example of a digital certificate.

A digital certificate is an electronic document that serves to link an individual or entity (e.g. name, address and other aspects of identification) and a public key. A digital certificate may be used to verify that a public key belongs to an individual or entity.

A digital certificate may be signed by a Certification Authority (CA) that certifies and validates the link between public key and the individual or entity. A certification authority is a trusted entity that can issue digital certificates using an electronic signature.

In the example of FIG. 14, the digital certificate 1400 is signed by the issuing entity (CA), this signature is indicated by the element 1405.

FIG. 14 shows the typical fields inside a digital certificate 1400, for example, an X.509 type certificate, which has widespread use on the Internet:

A serial number 1410 (Serial Number) which uniquely identifies the digital certificate.

Identification data 1420 (Subject) of the individual or entity that identifies and links the certificate.

The signature algorithm 1430 (Signature Algorithm) used for creating the signature of the certificate.

Issuer 1440 (Issuer) or entity that has verified the information contained in the certificate and has issued it.

Issue date 1450 (Valid-From) and expiry date 1455 (Valid-To) of the certificate.

Purpose of the public key 1460 (Key-Usage), such as encryption, signing, etc. . . .

Public Key 1470 (Public Key)

Algorithm used to calculate the hash of the certificate 1480 (Thumbprint Algorithm)

Hash of certificate 1490 (Thumbprint)

Figure 15:
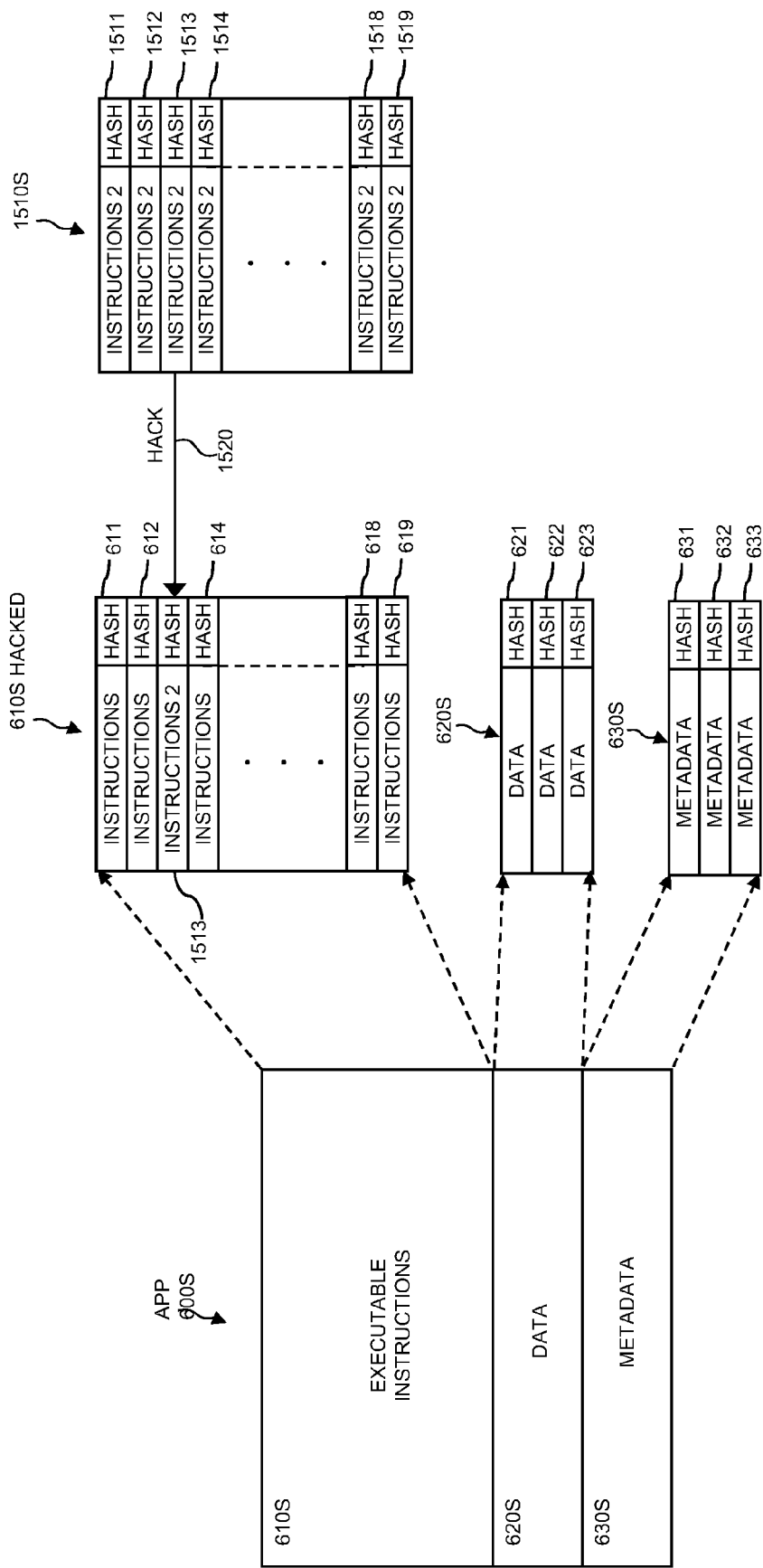
FIG. 15 shows an example of a hacked software program.

FIG. 15 shows an example of a hacked program. The example in FIG. 15 shows two programs 610S HACKED and 1510S comprising data blocks with hash values, but the program APP 610S HACKED has been altered replacing an original data block with the data block 1513 from the program 1510S.

In the example in FIG. 15, the program 1510S only shows the initial 4 blocks 1511, 1512, 1513 and 1514, and the last two blocks 1518 and 1519 to simplify the figure.

A hacker could register with the system 1020 shown in FIGS. 10 and 13 and provide a program 1510 so the system 1020 may add the hash value to each data block and transmit the program 1510S that includes the hash values to the application store system 1010.

The hacker could download the program 1510S comprising the hash values from the application store system 1010 and use data blocks of program 1510S to alter the program 610S.

For example by replacing the third data block of the program 610S by the data block 1513 of the program 1510S as indicated by arrow 1520 and thus the instructions needed to hack or alter the normal functioning of the program APP 610S could be executed in a computing device if the program APP 610S and the program 1510S use the same cryptographic keys and the same cryptographic algorithms.

In one implementation, to avoid this security issue, the system 1020 may assign each developer system different cryptographic keys.

In one implementation, the security component does not allow the same application to use different cryptographic keys in different data blocks comprising instructions of the same application.

Figure 16:
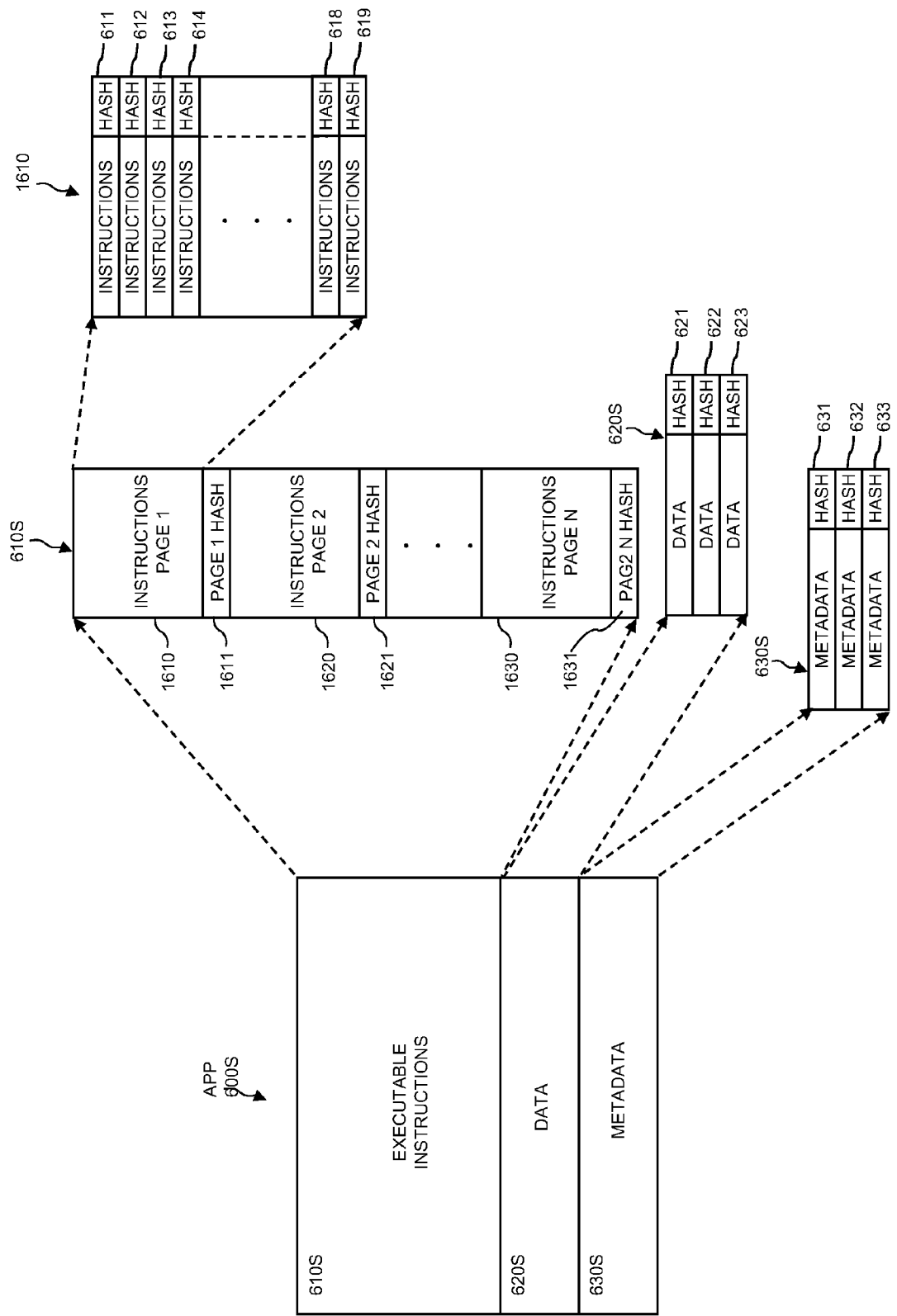
FIG. 16 shows an implementation with memory pages using hash values.

FIG. 16 shows another implementation wherein the application APP 600S, in addition to have a hash value in each data block also has a digital signature in each memory page.

In the example of FIG. 16, the application APP 600S comprises several pages of instructions of a similar size to the pages of memory used by the computing device 900.

In one implementation, the application APP 600S may have pages with instructions organized in data blocks with hash values and each page may store a digital signature.

For example, the APP 600S has the part 610S comprising a first page 1610 of instructions with a first digital signature 1611, a second page of instructions 1620 with a second digital signature 1621 and so on until completing the part 610S of application APP 600S, where the last page of instructions 1630 has the digital signatures 1631.

Figure 17:
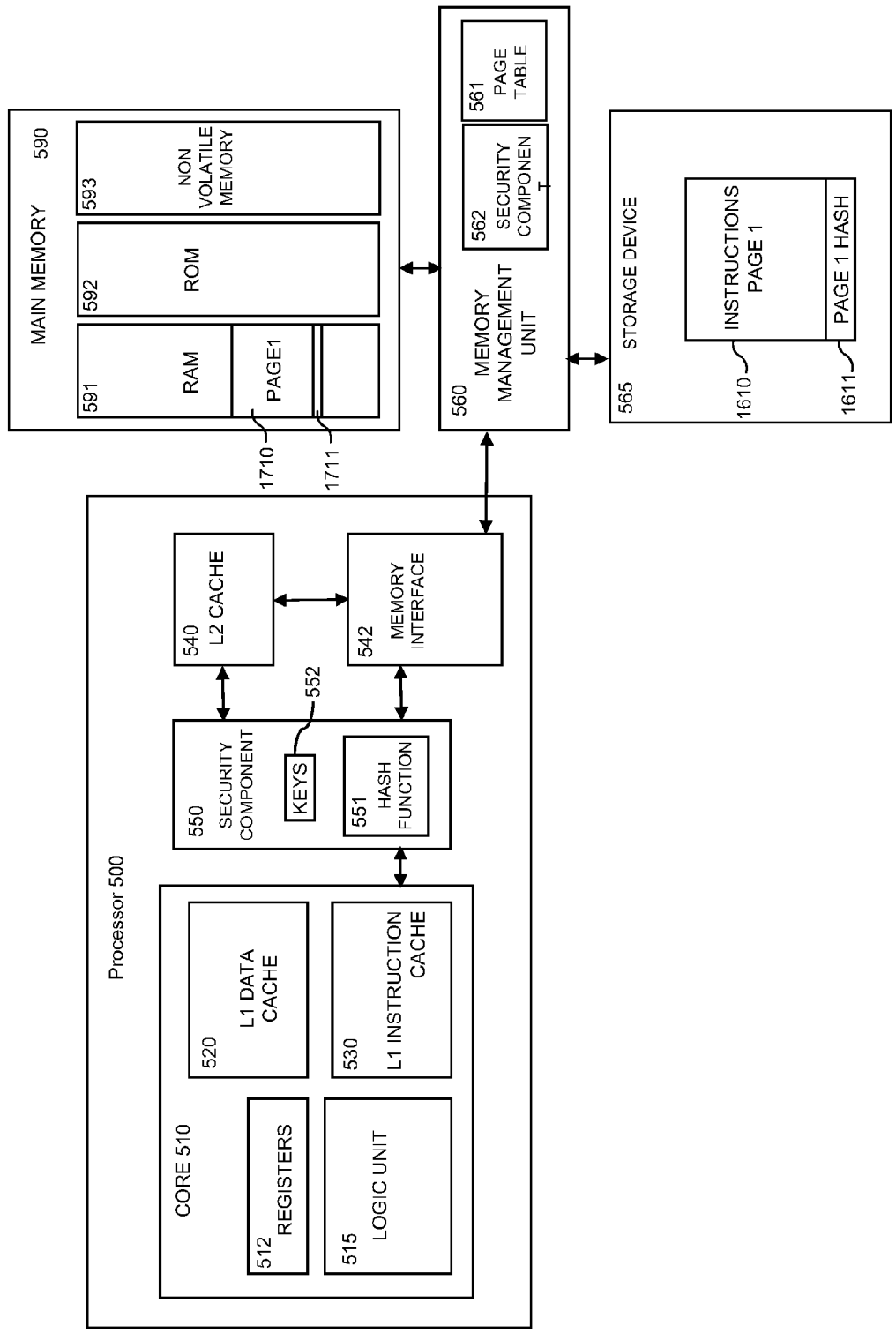
FIG. 17 shows an implementation with memory pages.

FIG. 17 shows the first page of instructions 1610 and its digital signature 1611 stored in a storage device 565.

When the MMU reads the memory page comprising data 1610 and 1611 to store it in the main memory 590, a second security component 562 in the MMU may verify that the digital signature 1611 calculated based on the data 1610 is correct and only then stores the page and its hash value in the main memory as indicated by elements 1710 and 1711.

The implementation shown in the example of FIGS. 16 and 17 makes it more difficult to alter or hack the application APP 600S.

In one implementation the cryptographic keys used to calculate the digital signatures 1611, 1621 and so on up to the digital signature 1631, are the same cryptographic keys used to calculate the hash values of each data block.

In one implementation, these hash values may be calculated in the system 1020. In another implementation the digital signatures and the hash values of each data block may be calculated in the developer system 1030 and the application comprising data blocks with hash values and digital signatures may be transmitted from system 1030 to system 1020 or directly to the application store system 1010.

In one implementation, the cryptographic keys used to compute the hash value 1611, 1621 and so on up to the hash value 1631, are different from those used to calculate the hash value of each data block. For example the developer system 1030 may use the PRIVATE KEY associated with the digital certificate 1210 to generate the digital signatures of the pages and the system 1020 may calculate the hash value of each data block using a different cryptographic key.

Figure 18:
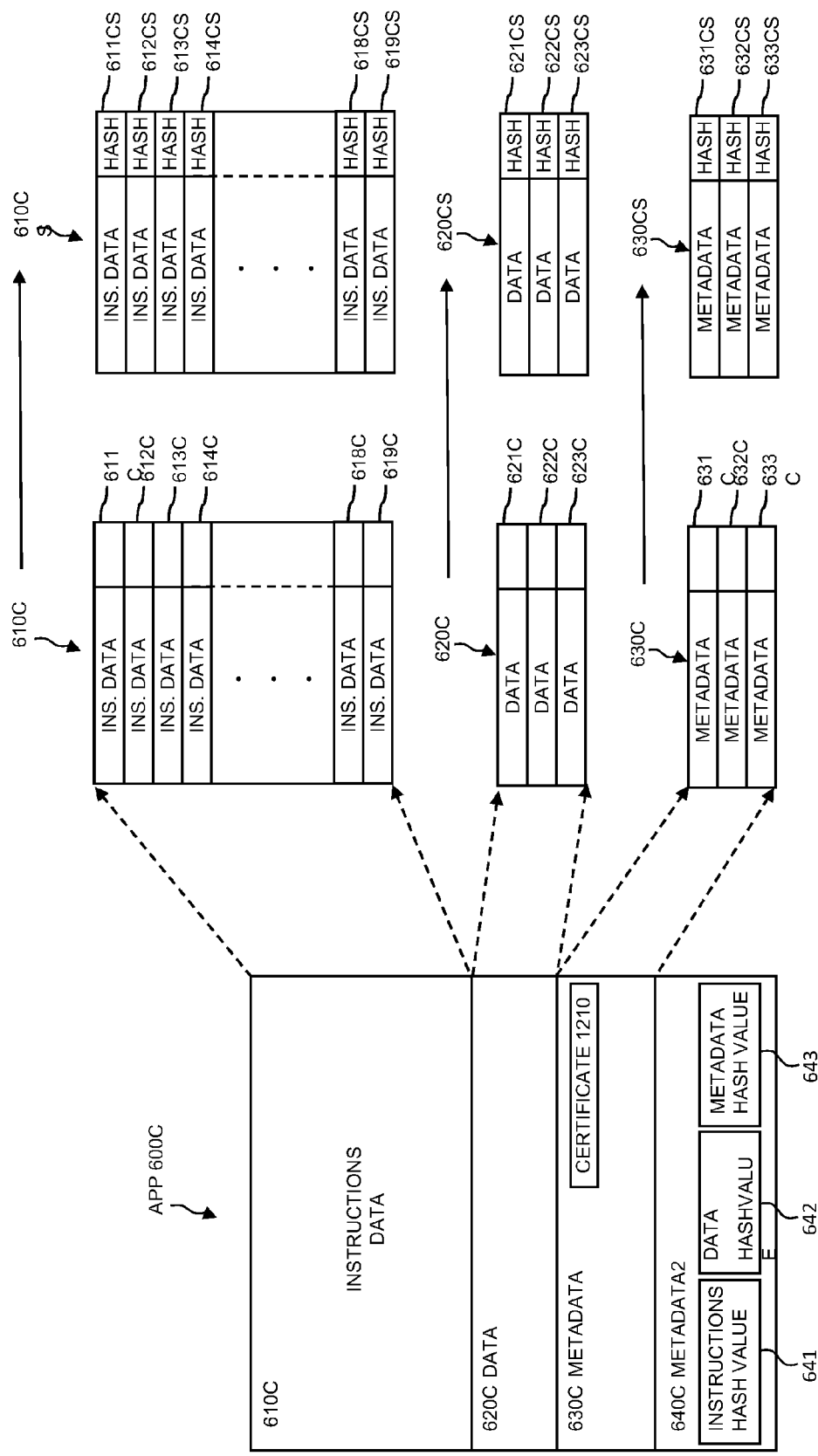
FIG. 18 shows an implementation wherein a software program can use different types of instructions.
Figure 19:
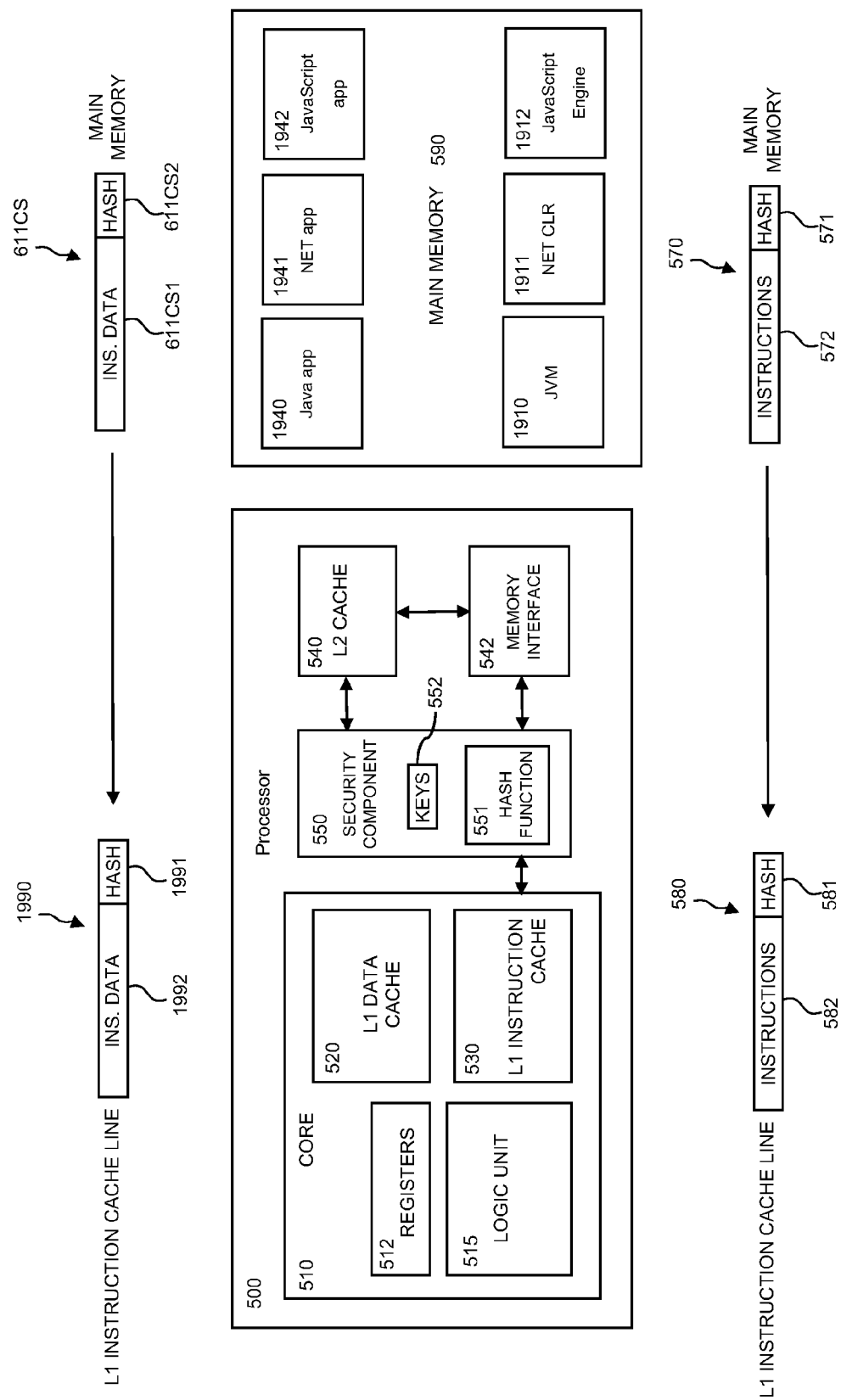
FIG. 19 shows an implementation with different types of instructions.
Figure 20:
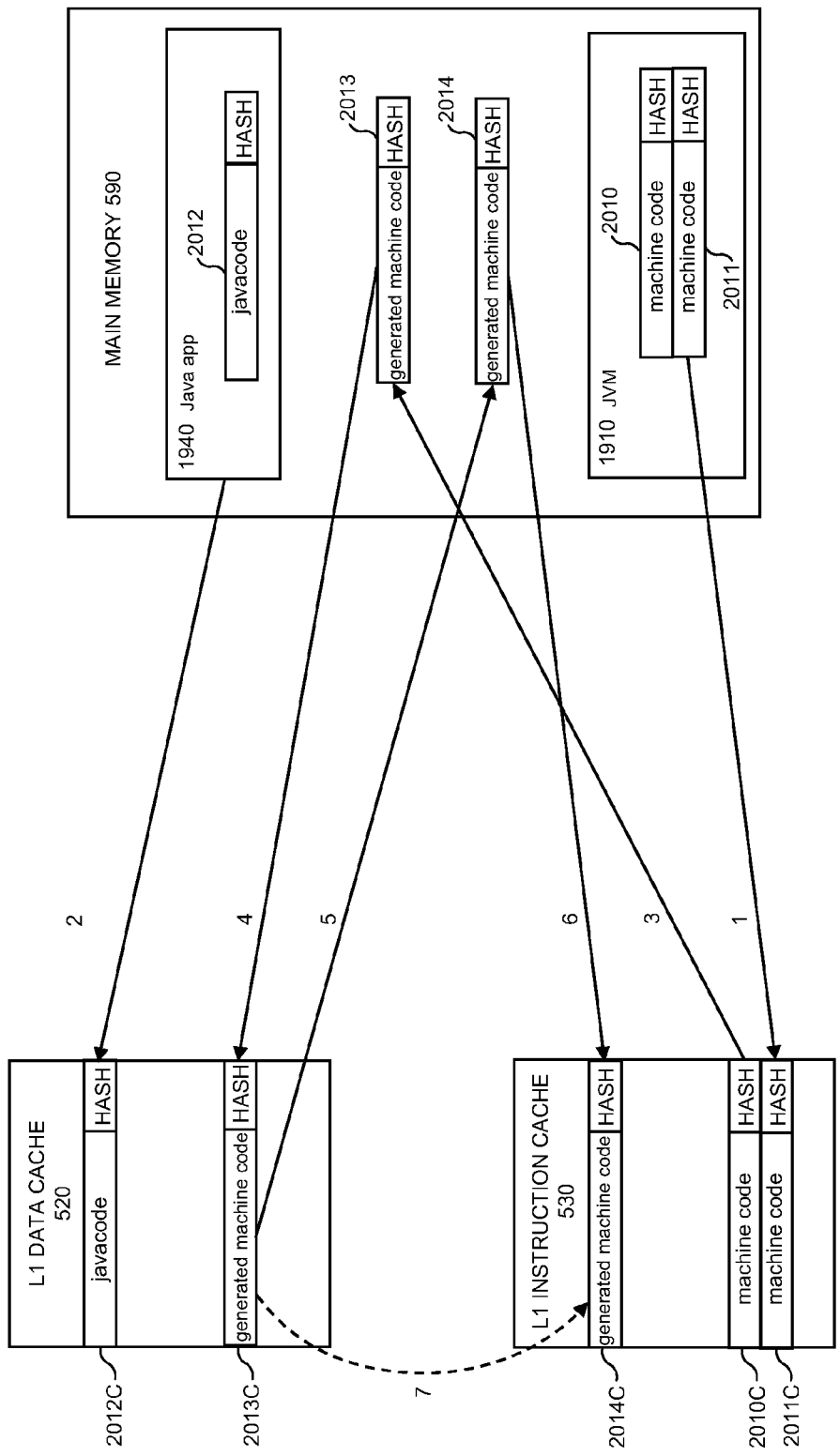
FIG. 20 shows an implementation with a software program containing instructions that are not directly executable by the processor.

FIGS. 18 to 20 show examples of different implementations that may use different programming languages.

Programs developers usually write programs in high level code, which the processor cannot execute. As such, this source code has to be converted into machine code. This conversion may be done by a compiler or an interpreter. A compiler makes the conversion just once, while an interpreter typically converts it every time a program is executed (or in some languages like early versions of BASIC, every time a single instruction is executed).

In computer science, an interpreter normally means a computer program that executes instructions written in a programming language. An interpreter may be a program that either: 1) executes the source code directly, 2) translates source code into some efficient intermediate representation (code) and immediately executes this, or 3) explicitly executes stored precompiled code made by a compiler which is part of the interpreter system.

Perl, Python, MATLAB, and Ruby are examples of type 2, while UCSD Pascal is type 3. Source programs are compiled ahead of time and stored as machine independent code, which is then linked at run-time and executed by an interpreter and/or JIT (Just In Time compilers). Some systems, such as Smalltalk, BASIC, Java and others may also combine types 2 and 3.

While interpreting and compiling are the two main means by which programming languages are implemented, these are not fully distinct categories, one of the reasons being that most interpreting systems also perform some translation work, just like compilers. The terms "interpreted language" or "compiled language" merely mean that the canonical implementation of that language is an interpreter or a compiler; a high level language is basically an abstraction which is (ideally) independent of particular implementations.

There is a spectrum of possibilities between interpreting and compiling, depending on the amount of analysis performed before the program is executed. For example, Emacs Lisp is compiled to bytecode, which is a highly compressed and optimized representation of the Lisp source, but is not machine code (and therefore not tied to any particular hardware). This "compiled" code is then interpreted by a bytecode interpreter (itself written in C). The compiled code in this case is machine code for a virtual machine, which is implemented not in hardware, but in the bytecode interpreter. The same approach is used with the Forth code used in Open Firmware systems: the source language is compiled into "F code" (a bytecode), which is then interpreted by a virtual machine.

Interpreted language is a programming language in which programs are 'indirectly' executed ("interpreted") by an interpreter program. This can be contrasted with a compiled language which is converted into machine code and then 'directly' executed by the host CPU.

Theoretically, any language may be compiled or interpreted, so this designation is applied purely because of common implementation practice and not some essential property of a language. Indeed, for some programming languages, there is little performance difference between an interpretive-based or compiled-based approach to their implementation.

Many languages have been implemented using both compilers and interpreters, including BASIC, C, Lisp, Pascal, and Python. While Java is translated to a form that is intended to be interpreted, just-in-time compilation is often used to generate machine code. The Microsoft .NET Framework languages always compile to Common Intermediate Language (CIL) which is then just-in-time compiled into native machine code. Many Lisp implementations can freely mix interpreted and compiled code. These implementations also use a compiler that can translate arbitrary source code at runtime to machine code.

FIG. 18 shows an implementation in which a software program or a software application APP 600C contains INSTRUCTIONS DATA 610C which may include different types of instructions such as "machine code", "bytecode" or instructions in high level language.

A computer program may comprise one or several different types of instructions that may be executed in different ways.

First types of instructions are the instructions that a microprocessor can execute directly, such as instructions called "machine code" or "native code". Hereafter, we use the term "machine code" to refer to the instructions directly executable by the microprocessor.

For example, a program developed in C++ language and compiled to convert it into machine code, can be executed directly by a microprocessor. Another example is a program developed in the language "assembly language" of a particular microprocessor and converted to "native code" of said microprocessor with a program that is often referred to as assembler.

Another type of instructions that can use the programs or software applications are instructions of interpreted programming languages.

For example, a program in JavaScript (language also called ECMAScript) can run on a computer using a "JavaScript Engine" or "JavaScript Interpreter" or "JavaScript implementation" which is a software program that interprets and executes JavaScript language programs.

JavaScript is a programming language widely used on websites and most browsers have an implementation that enables the execution of JavaScript programs.

Other types of instructions are called "bytecode" or "p-code". Bytecode contains instructions that are not a programming language or "machine code" instructions, but an intermediate type of instructions that are executed by a program called interpreter or "virtual machine" or with a JIT compiler ("Just In Time compiler").

The advantage of bytecode type instructions is that they are designed to become "machine code" quickly and allow their use in various computerized systems, for example, systems using different types of processors or different operating systems. Also, different programming languages can use the same bytecode, which facilitates the creation of programming tools in different languages.

For example, programs developed in Java can be converted into programs that use bytecode and can use a JIT compiler and/or JVM ("Java Virtual Machine") to convert the bytecode into "machine code" may be executed by a microprocessor. For example, JIT can be part of the JVM. The Java language bytecode is often called "Java bytecode".

Another bytecode example is the CIL language ("Common Intermediate Language") used in the development environment called "NET" from Microsoft. A program called NET CLR ("Common Language Runtime") converts the CIL data into machine code.

The program APP 600C may also contain data 620C, metadata 630C and second metadata 640C as described before; other configurations are possible. For example, metadata can be located in the program 600B before the instructions.

Instructions 610C may comprise different types of instructions, for example "machine code" type instructions that are run directly by the processor, bytecode instructions and/or instructions in an interpreted language.

Blocks 611C, 612C, 613C, 614C to 618C and 619C show an example of instructions data part 610C organized into data blocks, for example data blocks having the same number of bytes than the L1 cache line. In each data block there is a part with instructions shown in FIG. 18 using the abbreviation "INS. DATA" and another part that can stores the hash value of each block.

The example of FIG. 18 shows the data 620C comprising three data blocks 621C, 622C and 623C but different implementations may use a different number of data blocks.

FIG. 18 also shows the metadata 630C comprising of three data blocks 631C, 632C and 633C although other implementations may use a different number of metadata blocks.

Element 610CS of FIG. 18 shows the data blocks once the hash value has been added to each data block 611CS, 612CS, 613CS, 614CS and so on until completing all instructions with the blocks 618CS and 619CS.

Each hash value of each data block of the element 610CS may be calculated using a cryptographic hash function or cryptographic algorithm applied to the data containing the "INS. DATA" for each data block. In some implementations, the hash function or cryptographic algorithm may use cryptographic keys.

In some implementations, the data 620C and/or metadata 630C may also be organized in data blocks with a hash value for each data block as indicated by elements 620CS and 630CS of FIG. 18.

The example of FIG. 18 shows the data 620CS containing three data blocks 621CS, 622CS and 623CS but different implementations may use a different number of data blocks.

FIG. 18 also shows the metadata 630CS composed of three data blocks 631CS, 632CS and 633CS although other implementations may use a different number of metadata blocks.

FIG. 19 shows an example of one implementation that may verify the hash values of data blocks transferred from main memory to a cache line 580 of the L1 instruction cache and may also verify the hash values of data blocks transferred from the main memory to a cache line 590 in the L1 data cache.

Programs usually read and write data in the memory using the L1 data cache and it may be difficult to verify hash values from the cache lines in the L1 data cache.

In some implementations, the security component only verifies the hash values of certain data blocks transferred from the main memory to a cache line in the L1 data cache but the security component doesn't verify hash values when the processor writes data that changes the values stored in a cache line.

In some implementations, the security component may differentiate which data blocks comprise a hash value that should be verified and which data blocks should not be verified. In one implementation, the security component may use memory addresses (for example virtual memory addresses in computer systems using virtual memory) to determine if a data block comprises a hash value or not.

In one implementation the application programs stored in main memory use virtual memory and the data blocks stored between a first memory address and a second memory address store data blocks comprising hash values that the security component will verify when the data blocks are transferred to the cache lines of the L1 data cache.

In FIG. 19 element 570 represents a data block stored in main memory 590 and storing machine code instructions 572 and a hash value 571. In one implementation, the security component 550 verifies that the hash value 571 before data 570 can be stored in the L1 instruction cache and/or before the core 510 can execute instructions 572.

In FIG. 19, the element 580 represents the cache line of the L1 instruction cache 530 that stores the data block 570. The element 580 consists of instructions 582 and a hash value 581.

Element 611CS of FIG. 19 represents a data block stored in main memory 590. The data block 611CS has a first part 611CS1 storing any kind of data and a hash value 611CS2. In one implementation the data stored in the part 611CS may be instructions data comprising instructions that may be not executed directly by the core 510 like for example bytecode instruction. We indicate this type of instruction data with the label "INS. DATA".

In one implementation, when the microprocessor requests from the main memory data that is within the data block 611CS, the data block data 611CS is transferred to a cache line 1990 of the L1 data cache.

In one implementation, the security component 550 verifies that the hash value 611CS2 is correct before allowing the processor or CORE 510 to access data from the cache line 590 that stores the data block 611CS. This will prevent the INS.DATA instructions stored in part 611CS1 from being altered before being executed in the computing device having the processor 500, since if they are altered the security component detects that the hash value is not correct and does not transfer them to a cache line of L1 data cache.

In FIG. 19, element 1990 represents a cache line of L1 data cache storing the data block 611CS. The element 1990 stores data 1992 and the hash value 1991 corresponding to parts 611CS2 and 611CS1 respectively of data block 611CS.

In one implementation, the cache line 1990 of the L1 data cache that stores the data block 611CS has a "SECURE BIT" that the security component uses to indicate if the hash value 611CS2 is correct to allow or disallow access to the cache line data from the core 510.

For example a SECURE BIT may be associated with the cache line 1990 may store the value of 0 when the hash value of the cache line is incorrect or has not yet been verified by the security component and may store the value 1 when the security component has verified that the hash value is correct.

FIG. 19 shows several examples of instructions stored in main memory 590 and using different programming languages, the instructions not directly executable by the core 510.

For example, elements 1940 Java app, 1941 NET app and 1942 JavaScript app represent each one at least a part of three different computer programs stored in main memory 590. The expression "at least a part" is used because in systems with virtual memory it is not necessary that the entire application is stored in the main memory and memory pages are used to store in the physical memory parts or pages of each application while others pages can be stored in a device, as for example the STORAGE DEVICE 565 shown in FIG. 5.

In one implementation, the applications Java app 1940 and NET app 1941 contain bytecode that is organized in blocks such as the block 611CS, including in each block a first part comprising instructions and a second part storing a hash value. These blocks can be transferred from the main memory to cache lines in the L1 data cache and the security component may verify the hash values of the data blocks, for example before the core 510 can access the data transferred to a cache line of the L1 data cache.

For example, applications Java app 1940 and NET app 1941 may comprise data blocks such as 611CS with a first part 611BC1 comprising bytecode instructions and a second part storing a hash value.

The program applications 1910 JVM (Java Virtual Machine) and 1911 NET CLR (Common Language Runtime) may be used to convert bytecode instructions into machine code instructions, In another example, the application 1942 may contain instructions in a interpreted language, for example the JavaScript language, that are organized in blocks like as the block 611CS, including a part with instructions and a hash value. These blocks may be transferred to the L1 data cache and the security component may verify that the hash value is correct, for example before the core 510 accesses data from the cache line 1990 storing the data block 611CS.

In one implementation, the program 1912 JavaScript Engine can convert such instructions from JavaScript to machine code.

In another implementation, the JavaScript Engine program 1912 is an interpreter that executes instructions of the JavaScript language using for example machine code instructions that are part of the JavaScript Engine program 1912 itself.

In one implementation, applications 1910 JVM (Java Virtual Machine), 1911 NET CLR (Common Language Runtime) and 1912 JavaScript Engine may be stored, at least in part, in the main memory and at least a part of their instructions may be machine code instructions directly executable by the microprocessor In one implementation the machine code instructions of the programs JVM 1910, NET CLR 1911 and/or JavaScript Engine 1912 are organized in data blocks, comprising machine code instructions and hash values and the security component may verify the hash values before allowing the core to execute the machine code instructions.

FIG. 20 shows some implementations that may be used in software programs that do not consist solely of machine code type instructions. For example, programs that may comprise bytecode, like for example Javacode.

To simplify the explanation in FIG. 20 only the main memory 590 and cache memory L1 data cache 520 and L1 instruction cache 530 are shown.

In the example of FIG. 20 the program 1910 JVM (Java Virtual Machine) is a program organized at least in part in data blocks comprising machine code instructions and hash values and the security component may verify the hash values before allowing the core to execute the machine code instructions.

The program 1940 Java app is a Java program that comprises Javacode instructions, which can be converted into machine code instructions to be executed in the core 510.

In the example of FIG. 20, the JVM program 1910 may convert the Javacode instructions into machine code instruction that the core 510 may execute.

Although the example in FIG. 20 uses the Java language, other implementations may use other languages such as JavaScript, Visual Basic.NET or others In FIG. 20 the different process used in one implementation to convert Javacode instructions securely into machine code instructions are indicated by arrows 1, 2, 3, 4, 5 and 6.

Arrow 1 in FIG. 20 shows the process of transferring data blocks 2010, 2011 from the main memory to cache lines 2010C, 2011C in the L1 instruction cache. The data blocks 2010 and 2011 store machine code instructions of the JVM program 1910 and hash values. The security component may verify the hash values of data blocks 2010 and 2011 before the core 510 can execute their machine code instructions.

The Java app 1940 comprises data blocks like the data block 2012, with a first part comprising Javacode instructions and a second part storing a hash value.

In one implementation, when the processor executes the instructions stored in the cache line 2010C and/or cache line 2011C of the L1 instruction cache 530, the core 510 ask for data in the data block 2012 stored in main memory causing the transfer a the data block 2012 from main memory to a cache line 2012C in the L1 data cache 520. This step is shown in FIG. 20 by arrow 2.

In one implementation, the security component verifies that the hash value of data block 2012 is correct before storing the data block 2012 in the cache line 2012C or before allowing the core 510 to access the data stored in the cache line 2012C and if the hash value is not correct, the security component doesn't transfer the data block 2012 to the cache line 2012C or doesn't allow the core 510 to access the data stored in 2012C, for example using the SECURE bit as explained before.

In one implementation the JVM program 1910 may convert Javacode instructions into machine code instructions. This step is shown in FIG. 20 by the arrows 3 and 4.

The arrow 3 indicates that the core executing machine code instructions of the JVM program 1910, like the instructions stored in cache lines 2010C and 2011C of the L1 instruction cache, begins to convert bytecode instructions into machine code instructions that are written in the data block 2013 of the main memory.

Then the data block 2013 of the main memory is transferred to the cache line 2013C in the L1 data cache as shown by the arrow 4, so the core can write faster in the cache line 2013C. In this way the bytecode instructions stored in the cache line 2012C of the L1 data cache are converted in the machine code instructions stored in the cache line 2013C of the L1 data cache Machine code type instructions generated by the JVM program 1910 from the bytecode instructions may be stored in one or more cache lines of L1 data cache, for example cache line 2013C. In FIG. 20 these machine code instructions generated by the program JVM 1910 are indicated as "generated machine code"

In one implementation, to execute the generated machine code instructions stored in the cache line 2013C, the cache line 2013C may be transferred first to the main memory, for example to the data block 2014 stored in main memory.

The data block 2014 stored in the main memory may be stored, for example, in a memory block assigned by the operating system to the JVM program or a memory block assigned to the Java app 1940. This step is shown in FIG. 20 by arrow 5 (although the data block 2014 is shown outside the Java app 1940 and the JVM program 1910).

In one implementation, to execute the instructions generated by the JVM stored in the data block 2014 of the main memory, first these instructions may be transferred to the cache line 2014C in the L1 instruction cache. This step is shown by arrow 6.

In one implementation, the cache line 2013C may be transferred directly from the L1 data cache 530 to the cache line 2014C in the L1 instruction cache 530 as indicated by dashed line 7.

In one implementation, when the cache line 2013C is transferred from the L1 data cache to the L1 instruction cache directly, the cache line 2013C is also copied to a data block 2014 stored in the main memory 590.

In some implementations the cache line 2013C of the L1 data cache may be stored in a L2 cache memory (not shown in the FIG. 20) and then transferred from the L2 memory to the cache line 2014C in the L1 instruction cache.

In one implementation, once the byte Javacode instructions have been converted into generated machine code instructions stored in the L1 instruction cache, the core may execute the generated machine code instructions In some implementations the security component may calculate a hash value corresponding to the generated machine code instructions stored in the cache line 2013C in the L1 data cache and store the hash value in part of the cache line 2013C, like for example the last 20 bytes of a cache line of 128 bytes.

In one implementation, the security component may store a first private key and a second public key forming a cryptographic key pair and the security component may use the private key to calculate the hash value and store it in the cache line 2013C using a cryptographic hash function or cryptographic algorithm.

In one implementation, the cryptographic key pair or key used by the security component to generated the hash value in cache line 2013C is the same cryptographic key pair or key used to generate the hash values of the data block 2012 in the Java app 1940.

In one implementation the hash value stored by the security component in the cache line 2013C is temporary. For example, they may be valid for milliseconds, seconds, minutes, a day or a week.

In one implementation every time the processor executes an instructions of the JVM program 1910 that writes data in the cache line 2013C, where the JVM stores the generated machine code instructions, the security component 550 calculates a hash value and stores the hash value in the cache line 2013C.

In one implementation, the security component detects that cache line 2013C in the L1 data cache uses hash values because the virtual address in main memory associated with the cache line 2013 is an address between a first address and a second address reserved to be used with cache lines with hash values.

In one implementation, the security component does not allow other programs or applications other than the JVM program 1910 that is generating machine code instructions in cache line 2013C to access the data stored in the cache line 2013C This helps avoid a potential vulnerability consisting in modifying the instructions of the cache line 2013C between two processes of writing data in the cache line 2013 by the JVM program 1910.

In another implementation, to prevent instructions of cache line 2013C from being altered while being written by the JVM program 1910, each time an instruction is written in the cache line 2013 the JVM program 1910 makes a copy of the cache line 2013 data and stores it and the next time the JVM program 1910 is going to write an instruction in the cache line 2013, the JVM program 1910 first checks that the content of the cache line 2013 corresponds to the data copy by the JVM in the last modification.

There are some processors that can directly execute Java bytecode, for example, the processor picoJava is a microprocessor dedicated to native execution of Java bytecode without the need for an interpreter or just-in-time compiler.

In some implementations, the processor of the computing system is a Java processor that includes a SECURITY COMPONENT, and the Java processor may execute the Java bytecode instructions organized in data blocks, for example data blocks comprising 108 bytes of Java bytecode and a hash value of 20 bytes.

As explained before, in different implementations executable instructions may be stored in data blocks comprising a hash value.

Figure 21A:
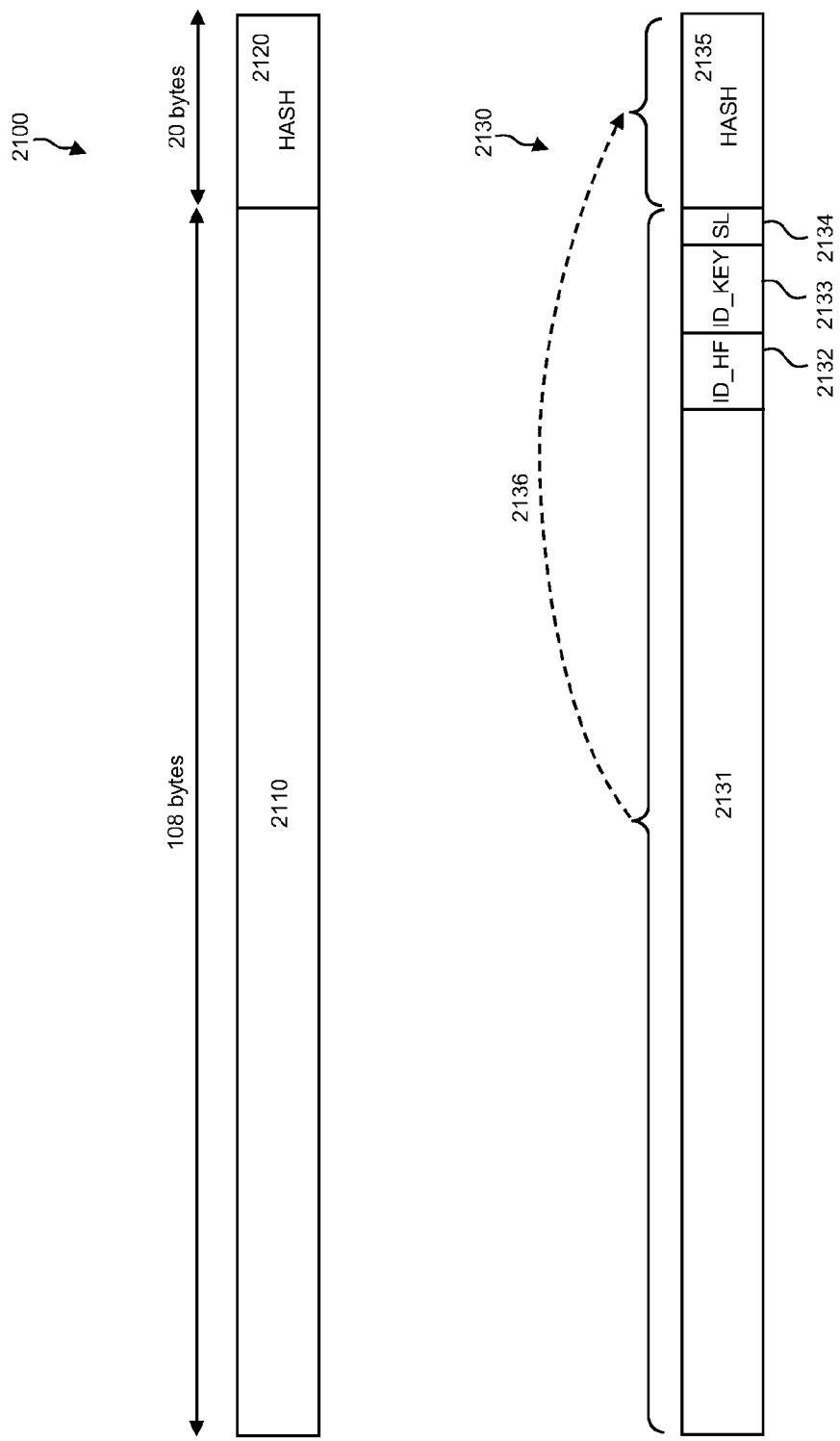
FIGS. 21A, 21B and 21C show examples of different cache lines.
Figure 21B:
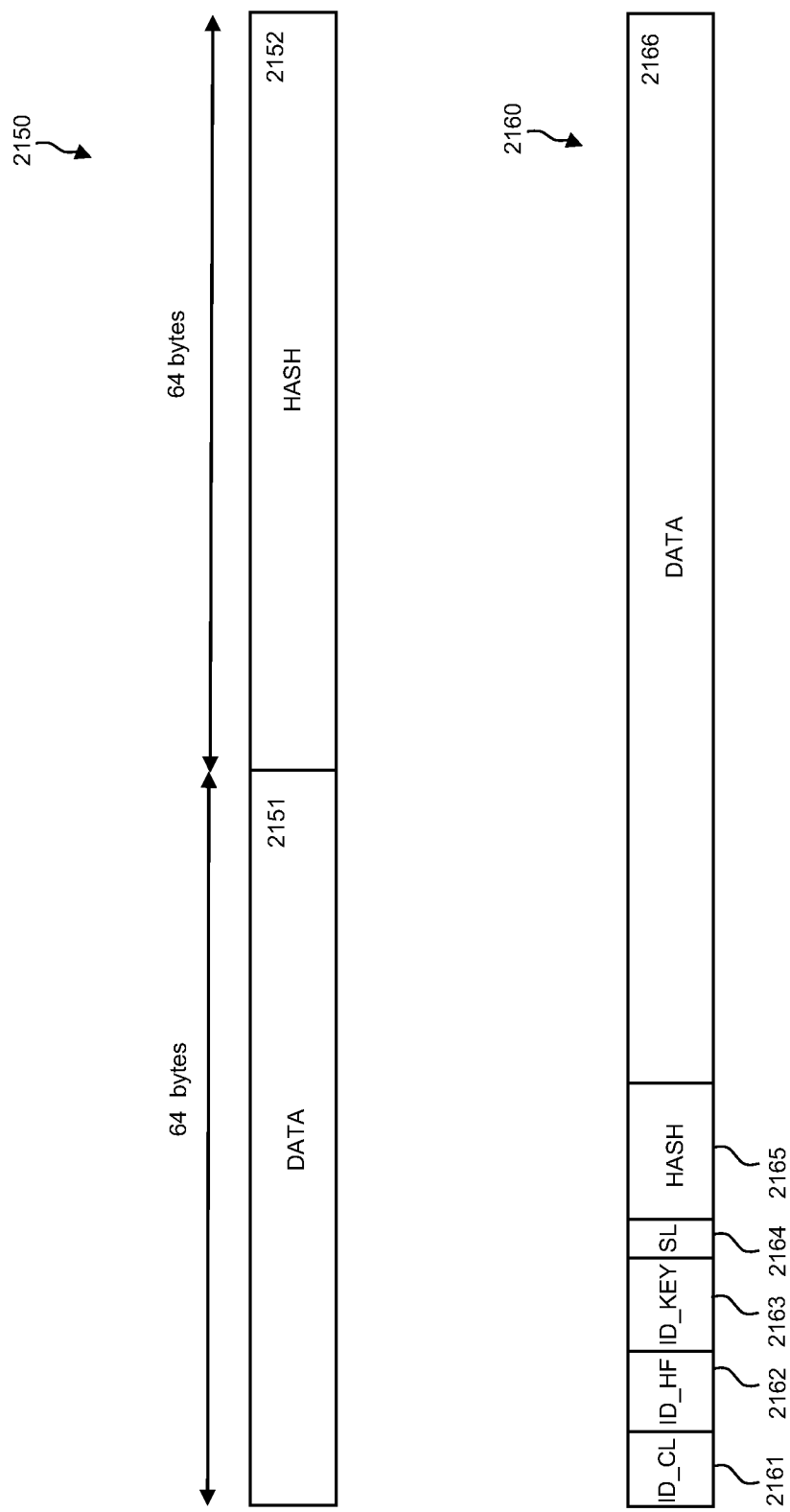

These data blocks may have different formats. FIGS. 21A and 21B show examples of data blocks formats, but other configurations are possible.

FIGS. 21A and 21B are not figures drawn to scale, and the size of the fields in the figure may not correspond to the size that would occupy if the figure was drawn to scale. The same may happen in other figures.

FIG. 21 shows an example of a data block 2100 of 128 bytes comprising a first data portion 2110 of 108 bytes and a second data portion that may store a hash value 2120 of 20 bytes. It's the same example of data block used in the previous examples and implementations although the data block size may vary, for example to match with the size of different L1 cache lines in different processors. In the same way, the sizes of the parts 2110 and 2120 may also vary.

FIG. 21 shows a second example of an implementation using a data block 2130. Data block 2130 may comprise data 2131 and data fields shown in the figure as ID_HF 2132, ID_KEY 2133, SL 2134 and HASH 2135 that are explained below.

Data 2131 may comprise instructions, for example machine code instructions or bytecode instructions. Data 2131 may also contain other type of data and/or metadata. In the example of FIG. 21 data block 2130 has 128 bytes and data 2131 occupy 101 bytes.

ID_HF data field 2132 is a data field that may contain a unique identifier, for example an integer, that identifies the cryptographic hash function or cryptographic algorithm used to calculate and/or verify the hash value 2135. In the example of the FIG. 21 the field ID_HF 2131 may use two bytes.

ID_KEY field 2133 is a field that may contain a unique identifier, for example an integer that identifies a cryptographic key. In the example of the FIG. 21 the field ID_KEY 2132 uses 4 bytes allowing to store $255^4$ (4,228,250,625) cryptographic key identifiers, for example using integer identifiers of 4 bytes.

In one implementation, the ID_KEY field does not store the cryptographic keys but an identifier that allows identifying each cryptographic key. For example, the security component may access a memory where cryptographic keys are stored and each cryptographic key may have a unique identifier that identifies it. This allows the security component to access to the cryptographic key specified in the field ID_KEY for using it in the crypto module with the cryptographic hash function or cryptographic algorithm specified in the field ID_HF to compute and/or verify the hash value 2135.

Although $255^4$, that is equivalent to 4,228,250,625, cryptographic key identifiers may seem sufficient, the same was thought years ago about IPv4 addresses composed of four bytes and since then the industry has realized that the need of more IP addresses were necessary. This caused the development of IPv6 addresses using 16 bytes.

In other implementations the field ID_KEY 2133 may use a larger number of bytes, for example 6, 8, 12 or 16 bytes, to store data that uniquely identify each cryptographic key.

Other implementations are possible. For example when the key associated to an ID_KEY is a public cryptographic key, the data block 2130 may have a KEY field instead of a ID_KEY field, and the KEY field may store the public cryptographic key directly instead of data that identifies the key.

SL field 2134 (SECURITY LEVEL) is a field that may be used to indicate the security level of the computer program containing the data block 2130. For example, the field SL may use one byte, where the value 0 corresponds to the lowest security level and the value 255 corresponds to the highest security level.

The field HASH 2135 may store a hash value computed using the hash function identified in data field ID_HF 2132 and the cryptographic key identified in data field ID_KEY 2133.

In one implementation, the hash value 2135 may be calculated and or verified using the cryptographic key and the data 2131, 2132, 2133 and 2134, as indicated by arrow 2136, to prevent these data and data fields to be altered.

FIG. 21B shows one implementation 2150 of data block of 128 bytes, having 64 bytes to store the data 2151, like for example machine code instructions, and 64 bytes (512 bits) to store the hash value 2152, for example using the hashing algorithm SHA512 that generates hash values of 512 bits.

FIG. 21B shows also an example of one implementation of a data block 2160 that may uses different formats.

In one implementation, ID_CL 2161 may be an identifier for the cache line format and the data block format, and different formats may have different total size and may use different fields of different lengths, for example different hash functions that generate different hash values of different lengths.

The ID_CL 2161 data field may be stored in a fixed location, like for example the first two bytes of the data. In the example 2160 of FIG. 21B the data field ID_CL 2161 is stored in the first two bytes of the data block 2160.

For example, a value 1 in the data field ID_CL 2161 may correspond to a data block 2160 with a total size of 128 bytes, that uses 2 bytes for the data field ID_CL 2161, 2 bytes for the data field ID_HF 2162, 4 bytes for data field ID_KEY 2163, 1 byte for the data field SL 2164, 32 bytes for the data field HASH 2165 that stores the hash value, and 87 bytes of data 2166 that may store, for example, machine code instructions.

In some implementations the value of the data field ID_CL determines other information of the data block, like for example the ID_HF, the ID_KEY and/or the SL fields.

In some implementations the value of the ID_CL data field determines the ID_HF value and there is no need to store the ID_HF information in the data block.

For example, the value 2 in the data field ID_CL may correspond to a data block with a total size of 128 bytes that always uses the SHA256 hashing algorithm. The fields in this example may be:

| | |
|---|---|
| ID_CL | 2 bytes |
| ID_KEY | 4 bytes |
| SL | 1 byte |
| HASH | 32 bytes (256 bits to store the hash value with SHA256) |
| DATA | 89 bytes (for example to store machine code instructions) |

Figure 21C:
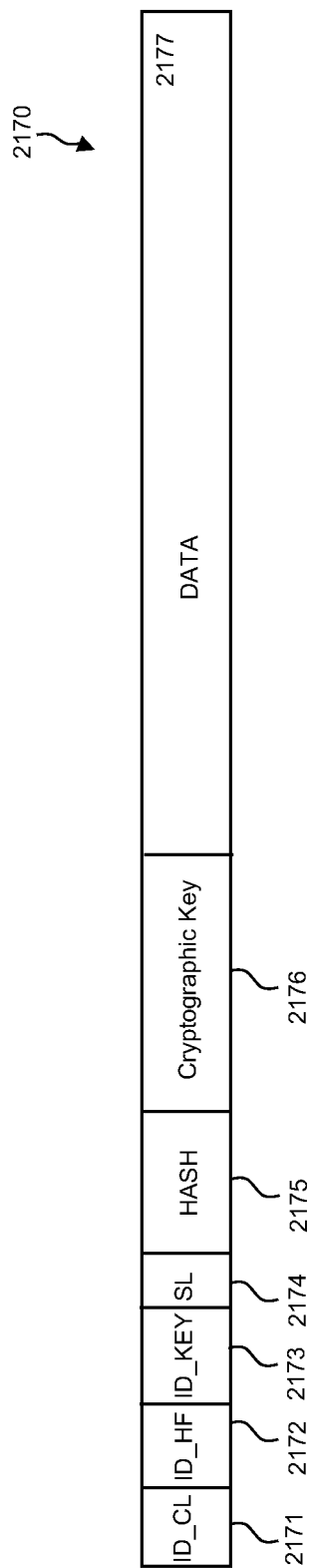

FIG. 21C shows also an example of one implementation of a data block 2170 that stores a cryptographic key, like for example a public key, in the data blocks comprising instructions and hash values. This way the security component hash direct access to the cryptographic key it may use to verify the data stored in a cache line.

In FIG. 23C the elements 2171 ID_CL, 2172 ID_HF, 2173 ID_KEY, 2174 SL, 2175 HASH have the same use as explained in FIG. 21B. The field 2176 stores the cryptographic key used to generate the hash value 2175, for example using as input data the data 2171 that may comprise instructions Hereinafter, different examples and implementations using the Security Level field on processors that use one or more cores are described.

Figure 22:
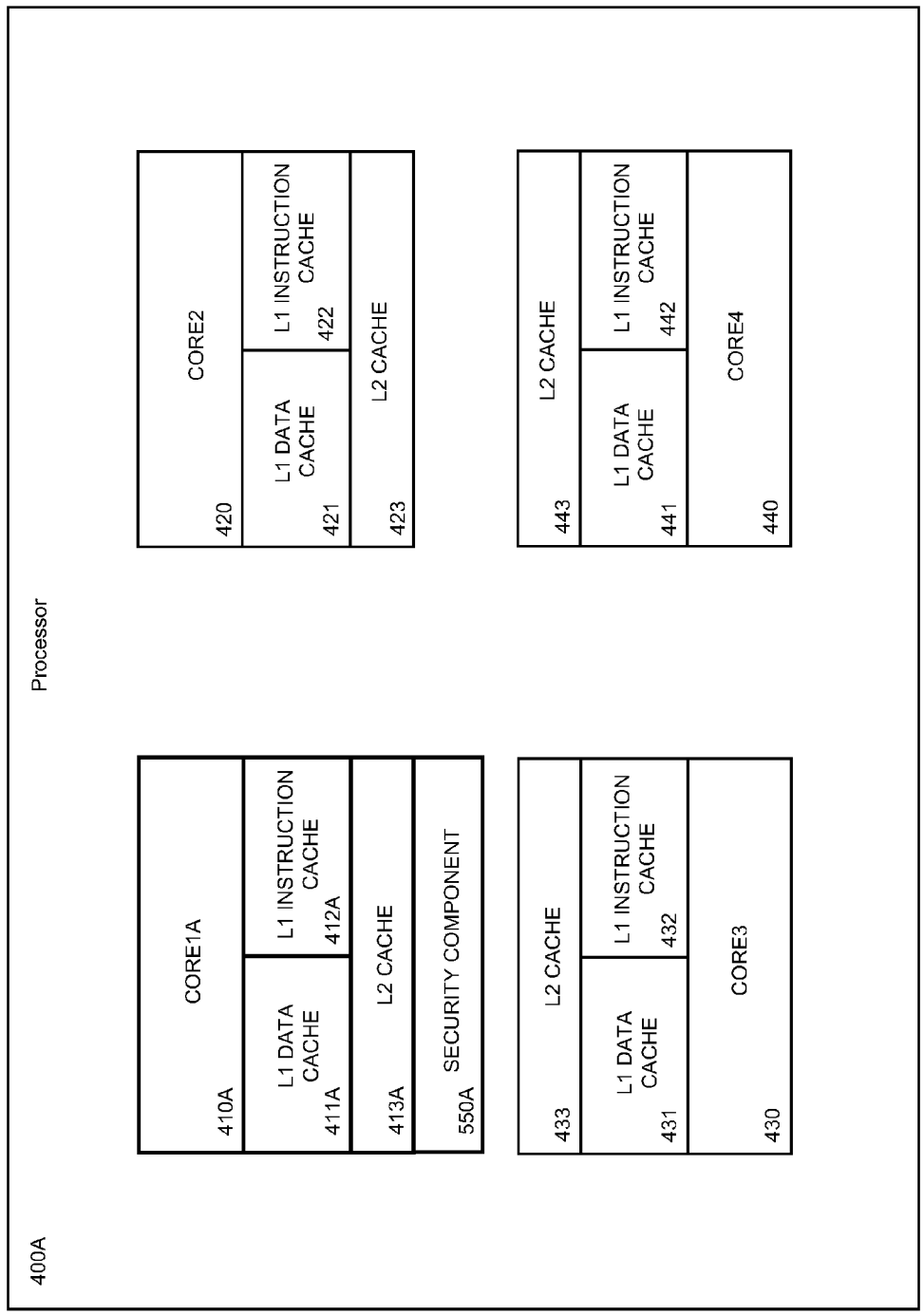
FIG. 22 shows an example of one implementation with a quad core processor with one core having one security component.

FIG. 22 shows an example of an implementation with a processor 400A that comprises four cores like the example of FIG. 4: CORE1A 410A, CORE2 420, CORE3 430 and CORE4 440. Each core comprises an L1 data cache 411A, 421, 431 and 441, respectively, an L1 instruction cache 412A, 422, 432 and 442, respectively, and an L2 cache 413A, 423, 433 and 443, respectively.

In the example of FIG. 22 only CORE 1 has a security component 550A allowing CORE 1 to check that the data blocks are transferred to the L1 data cache or to the L1 instruction cache if they have a correct hash value, as explained above in different implementations.

Hereinafter, the term secure core is used to refer to the cores that may use a security component to calculate and/or to verify the hash values of data stored or being stored in the cache lines.

In some implementation the secure cores having a security component and the cores not having a security component are similar cores, for example cores that may have the same registers, the same logic unit and the same set of instructions.

In one implementation the only difference between a secure core and a non-secure is that secures cores have security components and non-secure cores don't have security components.

In the example of FIG. 22, CORE1 is a secure core and the other three cores CORE2, CORE3 and CORE4 are non-secure cores.

Figure 23:
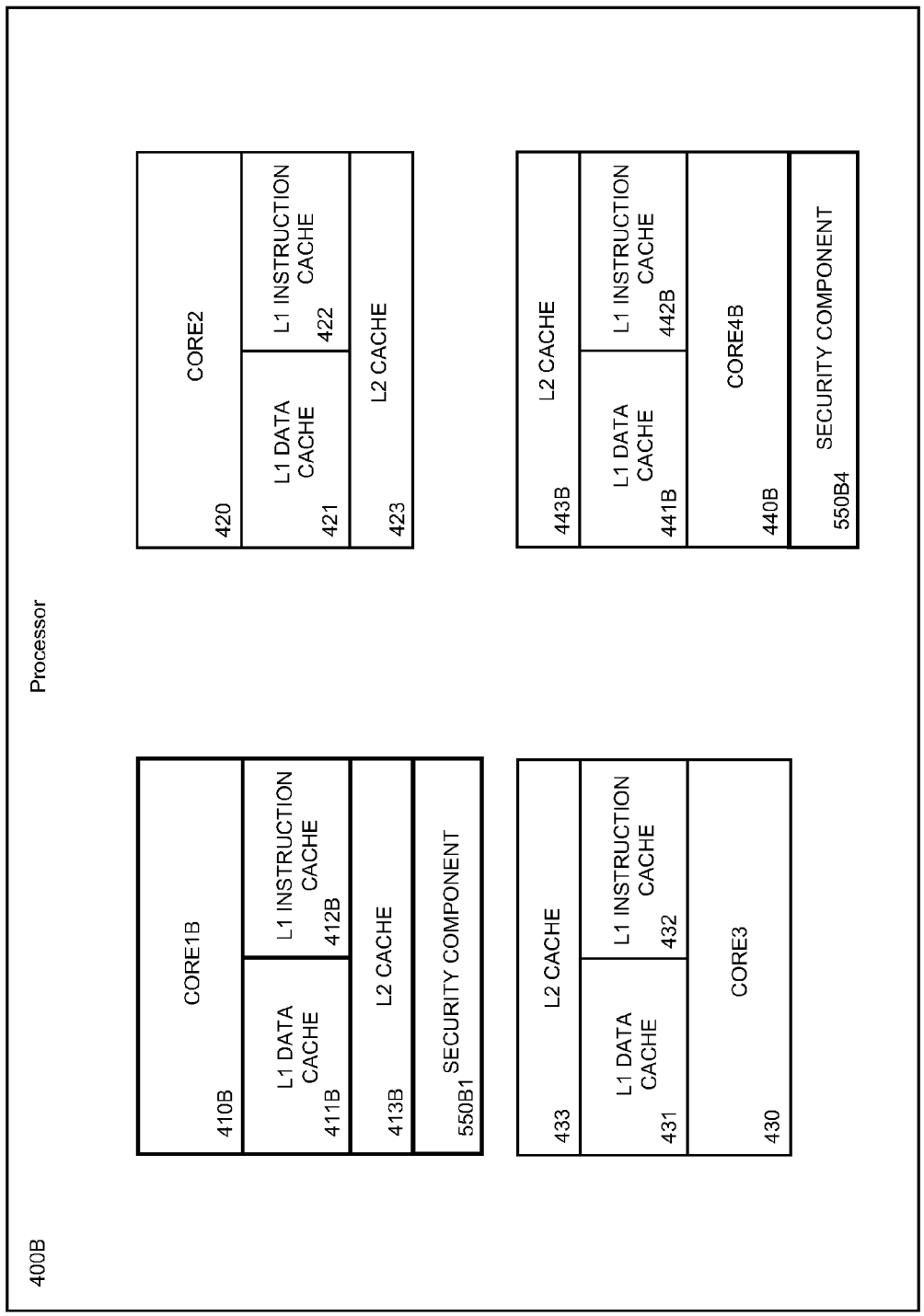
FIG. 23 shows an example of one implementation with a quad core processor with two cores having security components

FIG. 23 shows another example of an implementation with a processor 400B comprising four cores, CORE1B 410B, CORE2 420, CORE3 430 and CORE4B 440B. Each core CORE1B, CORE2, CORE3 and CORE4B comprises a L1 data cache 411B, 421, 431 and 441B, respectively, an L1 instruction cache 412B, 422, 432 and 442B, respectively, and an L2 cache 413B, 423, 433 and 443B, respectively. In the example of FIG. 23, the processor has two secure cores CORE1B and CORE4B, which may use a security component 550B1 and 550B4, respectively.

Figure 24:
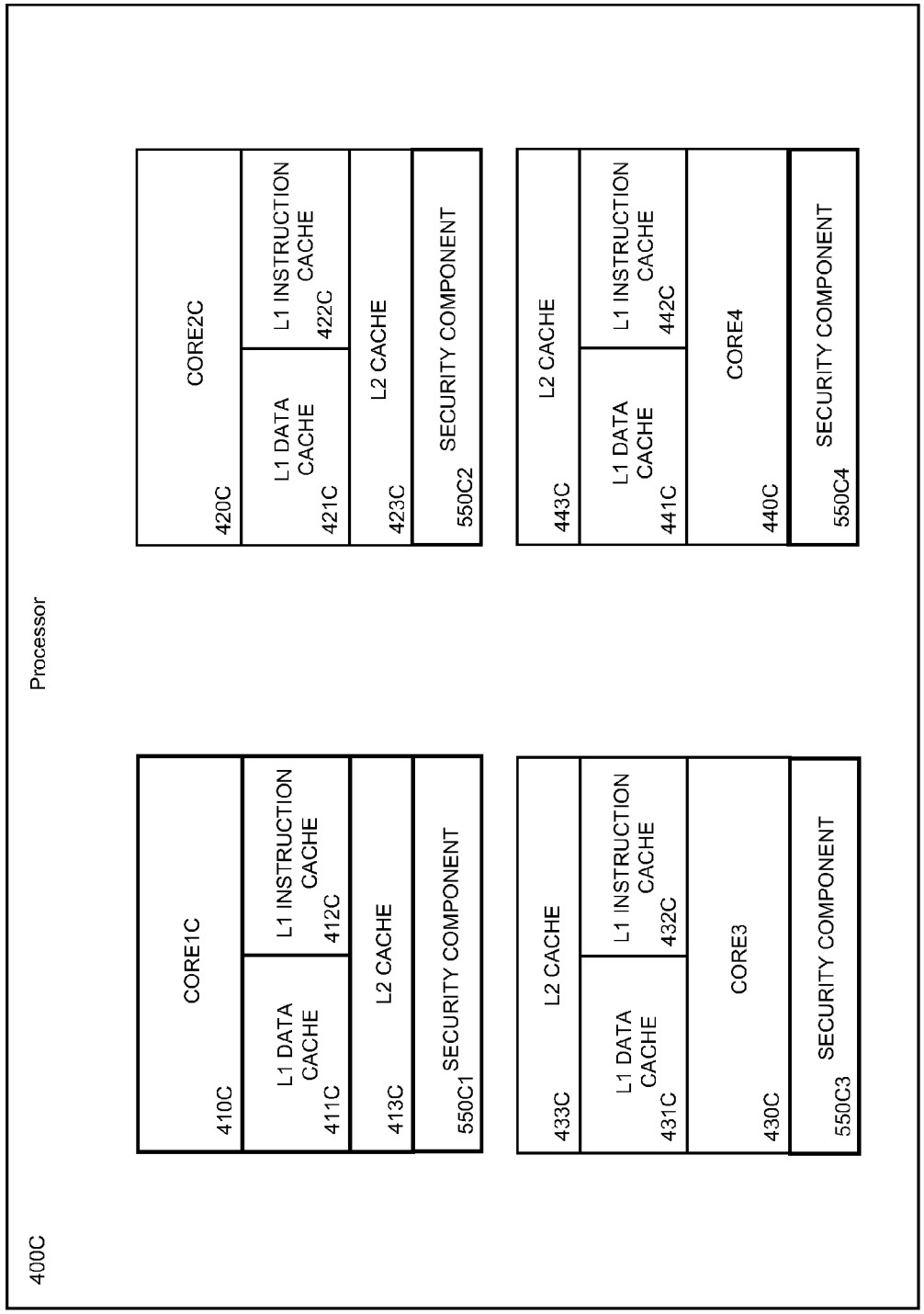
FIG. 24 shows an example of one implementation with a quad core processor with the four cores having security components.

FIG. 24 shows an example of an implementation with a processor 400C with four cores where all processor cores are secure cores. Each of the cores CORE1C 410C, CORE2C 420C, CORE3C 430C and CORE4C 440C may use a security component 550C1, 550C2, 550C3 and 550C4, respectively. Each core CORE1C, CORE2C, CORE3C and CORE4C comprises a L1 data cache 411C, 421C, 431C and 441C, respectively, an L1 instruction cache 412C, 422C, 432C and 442C, respectively, and an L2 cache 413C, 423C, 433C and 443C, respectively.

Figure 25:
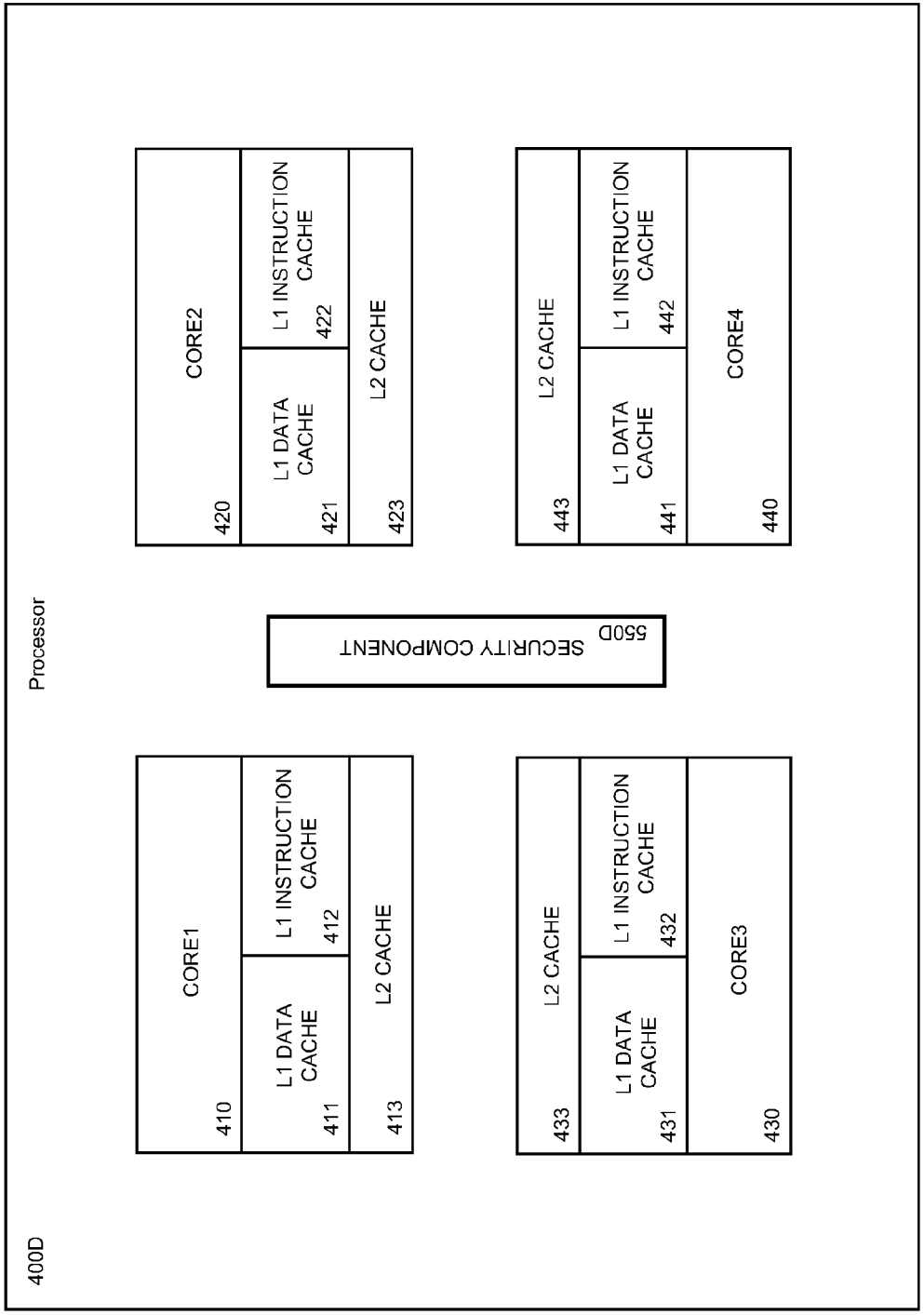
FIG. 25 shows an example of an implementation with a quad core processor and one security component.

FIG. 25 shows an example of an implementation of a processor 400D with four cores comprising one COMPONENT SECURITY 550D that may be used by any of the cores CORE 1, CORE 2, CORE 3 and CORE 4 of the processor 400D FIGS. 22, 23 and 24 show some examples of configurations of processors, but other combinations are possible, for example processors with more or less cores and/or secure cores.

In the examples of FIGS. 22 to 25, each core has its own L2 cache, however, other implementations may use different configurations, for example, several processor cores may share the same memory L2 cache.

In one implementation, each core shown in FIGS. 22 to 25 may use the same cryptographic keys and hash algorithms. In other implementations, each core may use different cryptographic keys and/or different hash algorithms.

Figure 26:
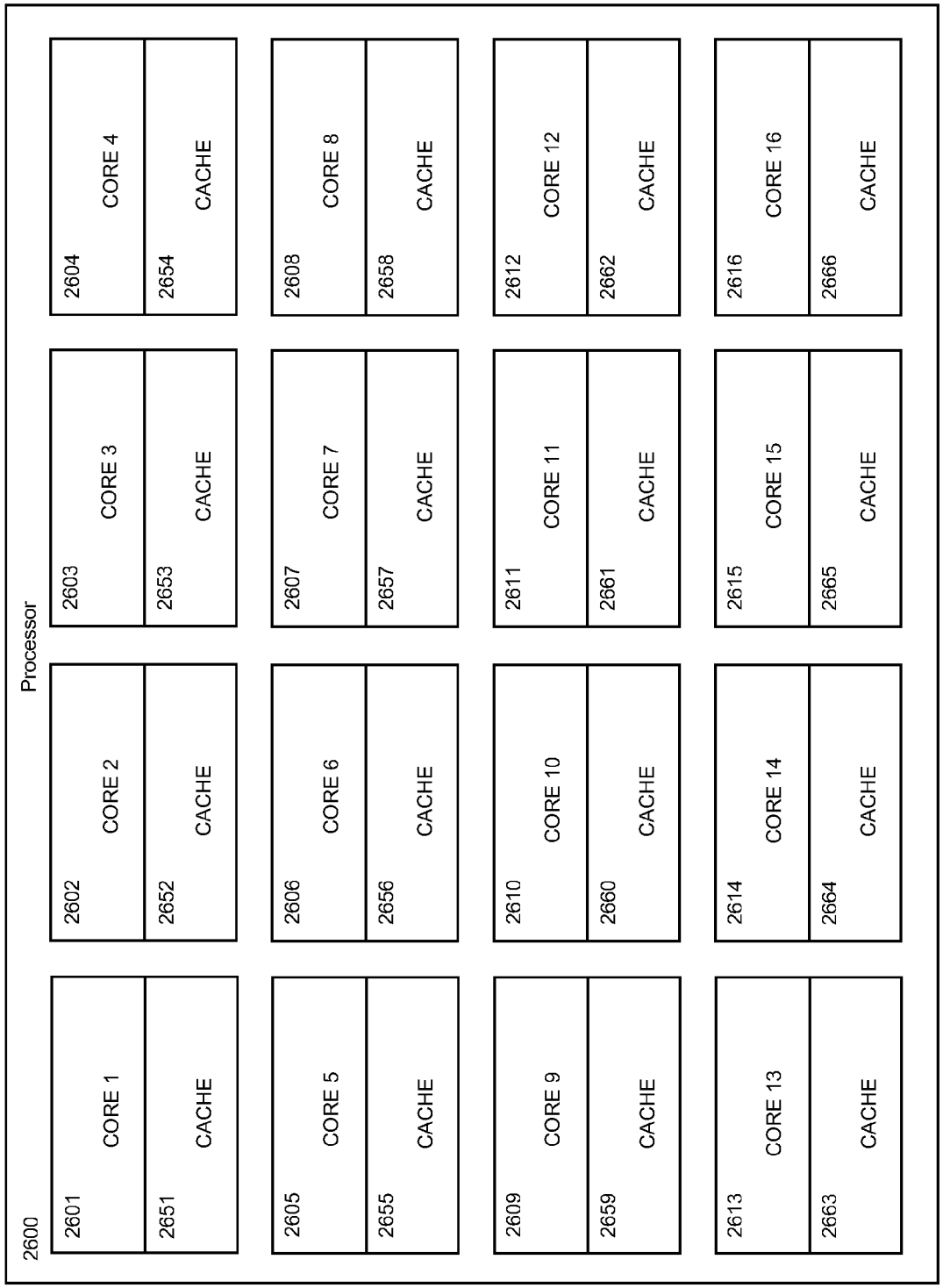
FIG. 26 shows and example of a processor with 16 cores used in some implementations.

FIG. 26 shows an example of an implementation of a processor with 16 cores. The processor 2600 comprises 16 cores; CORE 1 2601, CORE 2 2602, CORE 3 2603, CORE 4 2604, CORE 5 2605, CORE 6 2606, CORE 7 2607, CORE 8 2608, CORE 9 2609, CORE 10 2610, CORE 11 2611, CORE 12 2612, CORE 13 2613, CORE 14 2614, CORE 15 2615 and CORE 16 2616 comprising cache memories 2651, 2652, 2653, 2654, 2655, 2656, 2657, 2658, 2659, 2660, 2661, 2662, 2663, 2664, 2665 and 2666, respectively.

Different processor implementations of FIG. 26 may use a different number of secure cores, as for example 1, 2, 3, 4, 8 or 16 secure cores, or any number of secure cores between 1 and 16.

In another implementation a processor with "n" cores (for example 64 cores) may implement a number of secure cores between 1 and n (for example between 1 and 64 secure cores).

FIG. 26 does not shows the security components and the internal distribution of cache memories for the purpose of simplifying the figure.

Nowadays, the technology trend in processors is to include an ever larger number of cores in processors. Manufacturer's processor companies are designing and implementing increasingly processors with a larger number of cores. For example, AMD with 16 cores processor "Bulldozer", Intel with 48 cores processor "Westmere" or ClearSpeed Technology Ltd with 192 cores processor CSX700.

In some implementations, secure cores may execute programs that may affect the security of a computing device, for example the program or programs used by the computing device to load the operating system like for example the instructions stored in the computing device firmware or the instructions stored in the boot sector of the hard disk ("boot sector level 0"), some functions of the operating system, programs using cryptographic keys and algorithms, programs used to update the operating system, the operating system programs that detects the SECURITY LEVEL of other programs, antivirus programs and programs for detection and removal of malware programs.

A boot sector is a sector of a hard disk or similar data storage device contains machine code for booting programs (usually, but not necessarily, operating systems) stored in other parts of the disk. On an IBM PC compatible machine, for example, the BIOS selects a boot device, then it copies the first sector from the device (which may be a MBR, VBR or any executable code), to address location 0x7C00. On other systems, the process may be quite different. Since code in the boot sector is executed automatically, boot sectors have historically been a common attack vector for computer viruses.

In some implementations, programs requiring a lower security level may be executed in non-secure cores.

The security of computing device can be improved by restricting the programs that can be executed on secure cores. This may avoid the attack called "Instruction Cache Attack".

The publication "New Results on Instruction Cache Attacks", Onur Arigmez et al, from the book "Cryptographic Hardware and Embedded Systems"—CHES 2010, published by Springer (2010) explains an example of Instruction Cache Attack in which a core executes a first program containing cryptographic algorithms and using cryptographic keys and the attack consist of running in the same core a second spy program that find out the cryptographic keys used by the first program by using cryptoanalysis and analyzing the use of the cache memory.

In some implementations secure cores only execute instructions, for example machine code instructions, which are organized into data blocks that contain a hash value verified by the crypto module. That way the security component can verify the hash values before the core executes the instructions stored in the instruction cache line as explained above in different examples and implementations.

In other implementation each secure core may have assigned a security level, for example 255 may be the maximum security level and 0 may be the minimum security level.

For example, the security level of each core may be fixed at the time of manufacture and the value may be stored in the processor, for example in a memory accessible by the security component of each core.

In one implementation, when a program is going to be executed in a computing device that incorporates a processor with secure cores, the computing device determines before executing the program, the security level of the program, for example by reading the Security Level (SL) field shown in the example of FIG. 21 when the program comprises data blocks that have hash values and/or by reading the information from the metadata of the program.

In one implementation, the microprocessor checks that the security level indicated by the program is real to avoid, for example, a virus or other program that could affect the security of the computing device to be executed with a high security level higher to attack the computing device. To that end, the computing device may verify the electronic signatures and digital certificates included in the program and in its metadata and/or the hash values of data blocks used in the instructions, data and metadata parts of the program.

In one implementation, when a program does not have hash values or information about its security level that can be checked by digital signatures or hash values, the processor may assign the security level 0.

Once the program security level is determined, the processor and/or operating system may select the core or cores to run the program so that programs having a higher security level will run on the secure core with the highest security level and programs with lower security level will run on the secure cores with lowest security level or on non secure cores.

In one implementation, the processor may restrict the programs running on a certain secure core that has a security level SL1 to run only program in the core with a security level equal or greater than SL1.

In one implementation, the computing device may limit the security level of the programs running in the secure cores as well as the programs running on non-secure cores.

For example, in one implementation the security levels from 0 to 127 may be used with digital certificates included in the programs metadata that indicate the security level of the program and the safety level and security levels from 128 to 255 may be used in the computing device with programs that are composed by data blocks comprising a SL field and a hash value field, for example the data block 2150 of FIG. 21.

To eliminate or avoid the attack, the computing device may set a high security level value for all the programs allowed to be executed in the computing device, preventing to run a virus and/or a other program attacking the computing device or any other program having a security level below a certain value.

For example, if the computing device is configured to run only programs with a security level equal to or greater than 250, the virus or other attacker programs can not be executed in any of the secure processor cores. If all cores are safe, the virus or attacker program can not be executed on the computing device.

In one implementation the processor stores the security level information of each core, for example in a memory in the security component of each core and does not allow to run in the secure cores programs having a lower security level.

What is claimed is:

1. A computing device comprising:
   a. a main memory storing at least a first computer program comprising data blocks and a second computer program, the data blocks of the first computer program having a first data comprising executable instructions, a second data identifying a cryptographic key and a third data comprising a cryptographic hash value derived from the first data and the second data;
   b. a multi-core processor comprising a secure core comprising a security component and a non secure core devoid of a security component, the security component comprising:
      i. a first memory storing cryptographic keys; and
      ii. a cryptographic module configured to
         read a first data block stored in a cache line of the first cache memory;
         read the first memory to obtain a first cryptographic key;
         execute a first cryptographic hash algorithm implemented in logic gates inside the security component, wherein the cryptographic hash algorithm uses the first cryptographic key; and
         validate the first data block before the secure core executes the executable instructions stored in the first data of the first data block;
   c. an operating system comprising a table indicating which process or threads have data blocks having cryptographic hash values and a program loader configured to:
      i. detect that the first computer program comprises first executable instructions stored in data blocks having cryptographic hash values;
      ii. select the secure core to execute the first executable instructions;
      iii. detect that the second computer program comprises second executable instructions not stored in data blocks having cryptographic hash values; and
      iv. select the non secure core to execute the second executable instructions.

2. The computing device of claim 1, wherein the operating system is configured to execute certain programs, processes or threads of the operating system always in a secure core comprising a security component.

3. The computing device of claim 2, wherein the certain programs comprise parts of the operating system.

4. The computing device of claim 3, wherein a part of the operating systems that is always executed in a secure core is related with booting the computing device.

5. The computing device of claim 3, wherein the program loader is a part of the operating systems that is always executed in a secure core.

6. The computing device of claim 3, wherein a part of the operating systems that is always executed in a secure core is related with memory management.

7. The computing device of claim 1, wherein the security component comprises a Field Programmable Gate Array that may be configured, reconfigured or programmed to execute functions of the security component.

8. The computing device of claim 1, wherein the first cryptographic key is a secret key and the first cryptographic algorithm is a symmetric cryptographic algorithm.

9. The computing device of claim 1, wherein the first cryptographic key is a public key associated with a private key and the first cryptographic algorithm is an asymmetric cryptographic algorithm.

10. The computing device of claim 1, wherein the first core and the second core have the same registers, the same logic unit and the same set of instructions.

11. The computing device of claim 1, wherein the first core and the second core are adapted to execute the same type of machine instructions.

12. The computing device of claim 1, wherein the first core and the second core are adapted to execute instructions generated using the same assembly language.

13. The computing device of claim 1, wherein the first core and the second core have the same instruction set or instruction set architecture.

14. The computing device of claim 1, wherein the first core and the second core have the same micro-architecture.

15. The computing device of claim 1, wherein the first core and the second core have different micro-architectures.

* * * * *